United States Patent
Stein et al.

(10) Patent No.: US 11,928,006 B2
(45) Date of Patent: Mar. 12, 2024

(54) SYSTEM AND METHOD FOR LABELING BITS OF CONTROLLER AREA NETWORK (CAN) MESSAGES

(71) Applicant: SAFERIDE TECHNOLOGIES LTD., Tel Aviv-Jaffa (IL)

(72) Inventors: Yehiel Stein, Ramat Hasharon (IL); Yossi Vardi, Tel Aviv (IL); Nadav George Costa, Gedera (IL)

(73) Assignee: SAFERIDE TECHNOLOGIES LTD., Tel Aviv-Jaffa (IL)

( * ) Notice: Subject to any disclaimer, the term of this patent is extended or adjusted under 35 U.S.C. 154(b) by 281 days.

(21) Appl. No.: 17/436,134

(22) PCT Filed: Feb. 26, 2020

(86) PCT No.: PCT/IL2020/050213
§ 371 (c)(1),
(2) Date: Sep. 3, 2021

(87) PCT Pub. No.: WO2020/178811
PCT Pub. Date: Sep. 10, 2020

(65) Prior Publication Data
US 2022/0164248 A1 May 26, 2022

Related U.S. Application Data

(60) Provisional application No. 62/820,886, filed on Mar. 20, 2019, provisional application No. 62/817,648, (Continued)

(51) Int. Cl.
*G06F 11/07* (2006.01)
*G06N 20/20* (2019.01)
(Continued)

(52) U.S. Cl.
CPC ...... *G06F 11/0739* (2013.01); *G06F 11/0751* (2013.01); *G06F 11/3013* (2013.01);
(Continued)

(58) Field of Classification Search
CPC ............. G06F 11/0739; G06F 11/0751; G06F 11/3013; G06F 11/3409; G06F 11/3452;
(Continued)

(56) References Cited

U.S. PATENT DOCUMENTS 9,843,594 B1\* 12/2017 Evans ................. H04L 63/1425
2016/0188396 A1\* 6/2016 Sonalker ............... G06F 11/079
714/37

(Continued)

OTHER PUBLICATIONS

Markovitz et al. "Field Classification, Modeling and Anomaly Detection in Unknown CAN Bus Networks." In: Vehicular Communications vol. 9, Jul. 2017, pp. 43-52, [online] [retrieved on Mar. 4, 2020 (Mar. 4, 2020)) Retrieved from the Internet< URL: https://www.sciencedirect.com/science/article/pii/S2214209616300869 >.

*Primary Examiner* — David P Zarka

(57) ABSTRACT

A system for generating a set of rules for detecting Controller Area Network (CAN) messages anomalies, the system comprising a processing resource configured to: obtain a training set including a plurality of CAN messages, each CAN message having properties; train a model, using the training set, the model characterizing statistical relationships between one or more first types of CAN messages of respective first CAN message type and one or more second types of CAN messages each of respective second CAN message type, wherein the statistical relationships are based on one or more of the properties of the CAN messages of the training set; wherein the model is usable for identifying anomalies within a sequence of input CAN messages.

18 Claims, 7 Drawing Sheets

Related U.S. Application Data filed on Mar. 13, 2019, provisional application No. 62/813,188, filed on Mar. 4, 2019.

(51) Int. Cl.
| | |
|---|---|
| *G06F 11/30* | (2006.01) |
| *G06F 11/34* | (2006.01) |
| *H04L 12/40* | (2006.01) |
| *G06N 3/044* | (2023.01) |
| *H04L 9/40* | (2022.01) |
| *G06F 21/55* | (2013.01) |

(52) U.S. Cl.
CPC ...... *G06F 11/3409* (2013.01); *G06F 11/3452* (2013.01); *G06N 3/044* (2023.01); *G06N 20/20* (2019.01); *H04L 12/40* (2013.01); *H04L 63/1425* (2013.01); *G06F 21/554* (2013.01); *H04L 2012/40215* (2013.01); *H04L 2012/40273* (2013.01)

(58) Field of Classification Search
CPC ...... G06F 21/554; G06N 20/20; G06N 3/044; H04L 12/40; H04L 2012/40215; H04L 2012/40273; H04L 63/1425
USPC ......................................................... 709/224
See application file for complete search history.

(56) References Cited

U.S. PATENT DOCUMENTS

| | | | |
|---|---|---|---|
| 2016/0381059 A1 | 12/2016 | Galula et al. | |
| 2018/0012019 A1* | 1/2018 | Harris | ............... G06F 21/554 |
| 2019/0036948 A1* | 1/2019 | Appel | ............... H04L 63/1441 |
| 2019/0044912 A1* | 2/2019 | Yang | ............... G06F 21/50 |
| 2019/0141069 A1* | 5/2019 | Pogorelik | ............... B60W 20/50 |
| 2019/0173902 A1* | 6/2019 | Takahashi | ............ H04L 63/1425 |
| 2020/0128040 A1* | 4/2020 | Lazarescu | ............ H04L 63/1425 |
| 2020/0198651 A1* | 6/2020 | Levy | ............... G05D 1/0297 |
| 2020/0250774 A1* | 8/2020 | Agarwal | ............ G06Q 10/06315 |

\* cited by examiner

SYSTEM AND METHOD FOR LABELING BITS OF CONTROLLER AREA NETWORK (CAN) MESSAGES

TECHNICAL FIELD

The invention relates to a system and method for labeling bits of messages, and in more specific cases for labeling bits of CAN messages.

BACKGROUND

The presently disclosed subject matter invention, in some embodiments thereof, relates to labeling bit positions as affected/unaffected based on machine learning analysis of messages transmitted over communication channels of the vehicle.

The operation of vehicles such as, for example, cars, trucks, motorcycles, buses, trains, airplanes, drones, naval vessels, and/or the like has long ago become heavily reliant on automated systems utilizing multiple Electronic Control Units (ECU) deployed in the vehicle to control almost every aspect of the operation of the vehicle. This trend is naturally further intensified with the evolution of autonomic vehicles where the human factor, i.e. the human driver, is no longer the prime controller of the vehicle which is rather controlled by the automated and autonomous systems.

These automated and optionally autonomous systems may include a plurality of devices, for example, ECUs, sensors, Input/output (I/O) controllers and/or the like communicating with each other to transfer status and/or control data essential for operating the vehicle. These systems may further exchange data with each other thus creating a comprehensive, complex ecosystem within the vehicle.

To support this data exchange, each vehicle may include multiple wired and/or wireless communication channels, for example, Controller Area Network (CAN) bus, Local Interconnect Network (LIN), FlexRay, Local area Network (LAN), Ethernet, automotive Ethernet, Wireless LAN (WLAN, e.g. Wi-Fi), Media Oriented Systems Transport (MOST), Wireless CAN (WCAN) and/or the like to support the data transfer between the deployed devices. The vehicle communication channels are often segmented due to one or more constraints and/or purposes, for example, a requirement for functional segregation, vehicle physical deployment constraints, a hierarchical communication structure and/or the like.

A Controller Area Network (CAN) bus standard, for example, is a vehicle bus standard used by vehicle manufacturers. The CAN bus standard defines, inter alia, a structure of messages (referred to herein as CAN messages) to be transmitted on a vehicle's CAN bus. Each manufacturer, optionally in cooperation with Original Equipment Manufacturers (OEMs) providing parts for the vehicle, can design a custom CAN bus messaging scheme that is based on the CAN bus standard, so that messages (also referred to as CAN messages) can be exchanges between the various system of the vehicles manufactured thereby.

As noted, the automotive industry evolves and more and more vehicles become connected cars equipped with an Internet connection and/or with a wireless local area network, etc. This provides many clear benefits for both the car manufacturers, and the car owners and users. However, this evolution is not risk free. Such vehicles become increasingly sensitive to cyber-attacks and/or malfunctions, which pose a major threat to the car safety, both to the driver/passengers of the vehicle, and to the vehicles surrounding environment (e.g. other vehicles, pedestrians, infrastructure, etc.). It has been proven that cyber-attacks can be aimed at accessing safety-critical components of vehicles, including for example the vehicles throttle, brakes, and steering systems. Such cyber-attacks can be made by injecting CAN messages to the CAN bus, or by manipulating CAN messages, or in any other manner which results in various systems of the vehicle behaving in an undesirable manner.

Accordingly, it is desirable to have an ability to identify unauthorized access to any of the vehicle's sub-systems in order to prevent cyber-attackers from causing any harm. Such unauthorized access can be identified by detecting anomalous CAN messages flowing through the CAN bus, however, detecting such anomalies is not an easy task, since the syntax and the semantic of the CAN messages is maintained confidential by vehicle manufacturers and their suppliers. An additional factor that makes anomaly detection complicated is that some of the data comprised in the CAN messages is driver dependent and can also change over time as various components of the vehicle degrade. A way to reduce the complexity of the anomaly detection task is to label bit positions of CAN message types as affected or unaffected. This labeling can be utilized to focus the anomaly detection process.

There is thus a need in the art for a new method and system for labeling bits of CAN messages.

GENERAL DESCRIPTION

In accordance with a first aspect of the presently disclosed subject matter, there is provided a system for generating a set of rules for detecting Controller Area Network (CAN) messages anomalies, the system comprising a processing resource configured to: obtain a training set including a plurality of CAN messages associated with respective one or more vehicles, each CAN message having properties including (a) a CAN message type, (b) a size, (c) a payload, and (d) a corresponding timestamp; wherein for each CAN message type appearing in the plurality of CAN messages of the training set, the timestamps of the CAN messages of the corresponding CAN message type are derived from a stationary distribution; train a model, using the training set, the model characterizing statistical relationships between one or more first types of CAN messages of respective first CAN message type and one or more second types of CAN messages each of respective second CAN message type, wherein the statistical relationships are based on one or more of the properties of the CAN messages of the training set; wherein the model is usable for identifying anomalies within a sequence of input CAN messages upon a first input CAN message of the sequence of input CAN messages, having a first CAN message type, failing to meet a given statistical relationship, of the statistical relationships, with a second input CAN message of the sequence having a second CAN message type.

In some cases, the model is trained to characterize the statistical relationships between changes in the payloads of the one or more first types of CAN messages and changes in the payloads of the one or more second types of CAN messages.

In some cases, the model is further trained to estimate expected payloads of the one or more second types of CAN messages given a sequence of payloads of instances of CAN messages of the one or more first types of CAN messages.

In some cases, the model comprises a plurality of CAN message type classification models for a plurality of respective CAN message types that appear in the training set, each of the CAN message type classification models being trained by performing the following for the respective CAN message type, being a target CAN message type: creating a training matrix wherein: each row of the training matrix represents a given target instance of a plurality of target instances of CAN messages of the target CAN message type of the training set, and comprises: a target cell representing presence of a first change between the payload of the given target instance and the payload of a preceding target instance preceding the given target instance in the target instances, if any; and source cells, each of the source cells being associated with a respective CAN message type of the CAN message types excluding the target CAN message type, wherein: upon a source instance of a plurality of source instances of CAN messages of the corresponding CAN message type being present between the target instance and the preceding target instance of the training set, the respective source cell represents presence of a second change between the payload of the given source instance and the payload of a preceding source instance preceding the given source instance in the source instances, if any; and upon the source instance of a plurality of source instances of CAN messages of the corresponding CAN message type not being present between the target instance and the preceding target instance of the training set, the respective source cell represents a non-presence; wherein the source cells in each column of the matrix represents a corresponding CAN message type; and training, by a machine learning algorithm, the respective CAN message type classification model using the training matrix, to identify the correlations between the changes in the payloads of the CAN messages of the target CAN message type, and the changes in the payloads of the CAN message type of the CAN message types excluding the target CAN message type.

In some cases, the training matrix is created so that upon presence of more than one source instance of the plurality of source instances of CAN messages of the corresponding CAN message type being present between the target instance and the preceding target instance of the training set, a plurality of additional source cells are introduced into the row, each representing a respective instance of the plurality of source instances.

In some cases, the number of additional source cells introduces into the row is limited by a threshold.

In some cases, the machine learning algorithm is XGBoost.

In some cases, for at least part of the CAN message type classification models, the training further includes selecting statistically significant columns of the columns of the matrix, wherein the statistically significant columns are representative of the statistical relationships.

In some cases, for at least part of the CAN message type classification models, the training further includes training an encoder-decoder, with a first sequence of payloads of the target instances as output, and a second sequence of respective payloads of instances of CAN messages of the training set represented by the statistically significant columns and preceding the respective target instances as input.

In accordance with a second aspect of the presently disclosed subject matter, there is provided a classification system comprising a second processing resource, the second processing resource being configured to: receive a sequence of CAN messages intercepted on a monitored vehicle; and classify the sequence as comprising anomalies or not comprising anomalies using the model generated according to the first aspect.

In some cases, the second processing resource is further configured to perform an action upon determining that the sequence comprises anomalies.

In some cases, the action includes one or more of the following: providing an alert to an entity indicative of the sequence comprising anomalies; performing a prevention measure for blocking or correcting at least one of the CAN messages of the sequence before it is transmitted on a CAN bus of the monitored vehicle on which the CAN messages are to be transmitted, wherein the sequence is classified before it is transmitted on the CAN bus of the monitored vehicle.

In some cases, the entity is one or more of: a driver of a vehicle associated with the classified CAN message, a mechanic service provider, a cyber analyst, a fleet manager.

In some cases, the entity is a central system configured to receive alerts from a plurality of vehicles, and wherein the central system is configured to provide a user with one or more insights determined based on the anomalies detected within the sequence intercepted on the monitored vehicle, and based on additional anomalies detected within respective additional sequences of additional CAN messages intercepted on respective additional monitored vehicles.

In some cases, the sequence and the additional sequences are intercepted within a given time-period.

In accordance with a third aspect of the presently disclosed subject matter, there is provided a system for generating a set of rules for detecting Controller Area Network (CAN) messages anomalies, the system comprising a processing resource configured to: obtain a training set including a plurality of CAN messages associated with respective one or more vehicles, each CAN message having properties including (a) a CAN message type, (b) a size, (c) a payload, and (d) a corresponding timestamp; learn, based on the training set, statistical relationships between one or more first types of CAN messages of respective first CAN message type and one or more second types of CAN messages of respective second CAN message type, wherein the statistical relationships are based on one or more of the properties of the CAN messages of the training set; and automatically generate a set of rules, each rule of the rules defining a corresponding statistical relationship of the statistical relationships, wherein the set of rules is usable for identifying anomalies within a sequence of input CAN messages upon a first input CAN message of the sequence of input CAN messages, having a first CAN message type, failing to meet a given statistical relationship, of the statistical relationships, with a second input CAN message of the sequence of input CAN messages, having a second CAN message type.

In some cases, the statistical relationships is a payload-based statistical relationship, based on the payloads of first messages of the first types and second messages of the second types, wherein at least a first part of the payload of each instance of the first messages has a first payload-part pattern, given that a second part of the payload of each instance of the second messages following the respective instance of the first message, has a second payload-part pattern.

In some cases, each instance of the second messages is adjacent to the respective instance of the first message.

In some cases, at least one instance of the second messages is not adjacent to the respective instance of the first message.

In some cases, the statistical relationships is a time-and-payload-based statistical relationship, based on a combination of the corresponding timestamps and at least part of the payloads, of the first messages and the second messages.

In some cases, at least one of the first types and the second types have an identical CAN message type.

In some cases, at least one of the first types and the second types have different CAN message types.

In accordance with a fourth aspect of the presently disclosed subject matter, there is provided a classification system comprising a second processing resource, the second processing resource being configured to: receive a sequence of CAN messages intercepted on a monitored vehicle; and classify the sequence as comprising anomalies or not comprising anomalies using the set of rules of the fifth aspect.

In some cases, the second processing resource is further configured to perform an action upon determining that the sequence comprises anomalies.

In some cases, the action includes one or more of the following: providing an alert to an entity indicative of the sequence comprising anomalies; performing a prevention measure for blocking or correcting at least one of the CAN messages of the sequence before it is transmitted on a CAN bus of the monitored vehicle on which the CAN messages are to be transmitted, wherein the sequence is classified before it is transmitted on the CAN bus of the monitored vehicle.

In some cases, the entity is one or more of: a driver of a vehicle associated with the classified CAN message, a mechanic service provider, a cyber analyst, a fleet manager.

In some cases, the entity is a central system configured to receive alerts from a plurality of vehicles, and wherein the central system is configured to provide a user with one or more insights determined based on the anomalies detected within the sequence intercepted on the monitored vehicle, and based on additional anomalies detected within respective additional sequences of additional CAN messages intercepted on respective additional monitored vehicles.

In some cases, the sequence and the additional sequences are intercepted within at least one of: a given time-period or a given geographical area.

In accordance with a fifth aspect of the presently disclosed subject matter, there is provided a method for generating a set of rules for detecting Controller Area Network (CAN) messages anomalies, the method comprising: obtaining, by a processing resource, a training set including a plurality of CAN messages associated with respective one or more vehicles, each CAN message having properties including (a) a CAN message type, (b) a size, (c) a payload, and (d) a corresponding timestamp; wherein for each CAN message type appearing in the plurality of CAN messages of the training set, the timestamps of the CAN messages of the corresponding CAN message type are derived from a stationary distribution; training a model, by the processing resource, using the training set, the model characterizing statistical relationships between one or more first types of CAN messages of respective first CAN message type and one or more second types of CAN messages each of respective second CAN message type, wherein the statistical relationships are based on one or more of the properties of the CAN messages of the training set; wherein the model is usable for identifying anomalies within a sequence of input CAN messages upon a first input CAN message of the sequence of input CAN messages, having a first CAN message type, failing to meet a given statistical relationship, of the statistical relationships, with a second input CAN message of the sequence having a second CAN message type.

In some cases, the model is trained to characterize the statistical relationships between changes in the payloads of the one or more first types of CAN messages and changes in the payloads of the one or more second types of CAN messages.

In some cases, the model is further trained to estimate expected payloads of the one or more second types of CAN messages given a sequence of payloads of instances of CAN messages of the one or more first types of CAN messages.

In some cases, the model comprises a plurality of CAN message type classification models for a plurality of respective CAN message types that appear in the training set, each of the CAN message type classification models being trained by performing the following for the respective CAN message type, being a target CAN message type: creating a training matrix wherein: each row of the training matrix represents a given target instance of a plurality of target instances of CAN messages of the target CAN message type of the training set, and comprises: a target cell representing presence of a first change between the payload of the given target instance and the payload of a preceding target instance preceding the given target instance in the target instances, if any; and source cells, each of the source cells being associated with a respective CAN message type of the CAN message types excluding the target CAN message type, wherein: upon a source instance of a plurality of source instances of CAN messages of the corresponding CAN message type being present between the target instance and the preceding target instance of the training set, the respective source cell represents presence of a second change between the payload of the given source instance and the payload of a preceding source instance preceding the given source instance in the source instances, if any; and upon the source instance of a plurality of source instances of CAN messages of the corresponding CAN message type not being present between the target instance and the preceding target instance of the training set, the respective source cell represents a non-presence; wherein the source cells in each column of the matrix represents a corresponding CAN message type; and training, by a machine learning algorithm, the respective CAN message type classification model using the training matrix, to identify the correlations between the changes in the payloads of the CAN messages of the target CAN message type, and the changes in the payloads of the CAN message type of the CAN message types excluding the target CAN message type.

In some cases, the training matrix is created so that upon presence of more than one source instance of the plurality of source instances of CAN messages of the corresponding CAN message type being present between the target instance and the preceding target instance of the training set, a plurality of additional source cells are introduced into the row, each representing a respective instance of the plurality of source instances.

In some cases, the number of additional source cells introduces into the row is limited by a threshold.

In some cases, the machine learning algorithm is XGBoost.

In some cases, for at least part of the CAN message type classification models, the training further includes selecting statistically significant columns of the columns of the matrix, wherein the statistically significant columns are representative of the statistical relationships.

In some cases, for at least part of the CAN message type classification models, the training further includes training an encoder-decoder, with a first sequence of payloads of the target instances as output, and a second sequence of respective payloads of instances of CAN messages of the training set represented by the statistically significant columns and preceding the respective target instances as input.

In accordance with a sixth aspect of the presently disclosed subject matter, there is provided a classification method comprising: receiving, by a second processing resource, a sequence of CAN messages intercepted on a monitored vehicle; and classifying the sequence as comprising anomalies or not comprising anomalies using the model of the fifth aspect.

In some cases, the method further comprises performing an action upon determining that the sequence comprises anomalies.

In some cases, the action includes one or more of the following: providing an alert to an entity indicative of the sequence comprising anomalies; performing, a prevention measure for blocking or correcting at least one of the CAN messages of the sequence before it is transmitted on a CAN bus of the monitored vehicle on which the CAN messages are to be transmitted, wherein the sequence is classified before it is transmitted on the CAN bus of the monitored vehicle.

In some cases, the entity is one or more of: a driver of a vehicle associated with the classified CAN message, a mechanic service provider, a cyber analyst, a fleet manager.

In some cases, the entity is a central system configured to receive alerts from a plurality of vehicles, and wherein the central system is configured to provide a user with one or more insights determined based on the anomalies detected within the sequence intercepted on the monitored vehicle, and based on additional anomalies detected within respective additional sequences of additional CAN messages intercepted on respective additional monitored vehicles.

In some cases, the sequence and the additional sequences are intercepted within a given time-period.

In accordance with a seventh aspect of the presently disclosed subject matter, there is provided a method for generating a set of rules for detecting Controller Area Network (CAN) messages anomalies, the method comprising: obtaining, by a processing resource, a training set including a plurality of CAN messages associated with respective one or more vehicles, each CAN message having properties including (a) a CAN message type, (b) a size, (c) a payload, and (d) a corresponding timestamp; learning, by the processing resource, based on the training set, statistical relationships between one or more first types of CAN messages of respective first CAN message type and one or more second types of CAN messages of respective second CAN message type, wherein the statistical relationships are based on one or more of the properties of the CAN messages of the training set; and automatically generating, by the processing resource, a set of rules, each rule of the rules defining a corresponding statistical relationship of the statistical relationships, wherein the set of rules is usable for identifying anomalies within a sequence of input CAN messages upon a first input CAN message of the sequence of input CAN messages, having a first CAN message type, failing to meet a given statistical relationship, of the statistical relationships, with a second input CAN message of the sequence of input CAN messages, having a second CAN message type.

In some cases, the statistical relationships is a payload-based statistical relationship, based on the payloads of first messages of the first types and second messages of the second types, wherein at least a first part of the payload of each instance of the first messages has a first payload-part pattern, given that a second part of the payload of each instance of the second messages following the respective instance of the first message, has a second payload-part pattern.

In some cases, each instance of the second messages is adjacent to the respective instance of the first message.

In some cases, at least one instance of the second messages is not adjacent to the respective instance of the first message.

In some cases, the statistical relationships is a time-and-payload-based statistical relationship, based on a combination of the corresponding timestamps and at least part of the payloads, of the first messages and the second messages.

In some cases, at least one of the first types and the second types have an identical CAN message type.

In some cases, at least one of the first types and the second types have different CAN message types.

In accordance with an eighth aspect of the presently disclosed subject matter, there is provided a classification method comprising: receiving, by a second processing resource, a sequence of CAN messages intercepted on a monitored vehicle; and classifying, by the second processing resource, the sequence as comprising anomalies or not comprising anomalies using the set of rules of the seventh aspect.

In some cases, the second processing resource is further configured to perform an action upon determining that the sequence comprises anomalies.

In some cases, the action includes one or more of the following: providing an alert to an entity indicative of the sequence comprising anomalies; performing a prevention measure for blocking or correcting at least one of the CAN messages of the sequence before it is transmitted on a CAN bus of the monitored vehicle on which the CAN messages are to be transmitted, wherein the sequence is classified before it is transmitted on the CAN bus of the monitored vehicle.

In some cases, the entity is one or more of: a driver of a vehicle associated with the classified CAN message, a mechanic service provider, a cyber analyst, a fleet manager.

In some cases, the entity is a central system configured to receive alerts from a plurality of vehicles, and wherein the central system is configured to provide a user with one or more insights determined based on the anomalies detected within the sequence intercepted on the monitored vehicle, and based on additional anomalies detected within respective additional sequences of additional CAN messages intercepted on respective additional monitored vehicles.

In some cases, the sequence and the additional sequences are intercepted within at least one of: a given time-period or a given geographical area.

In accordance with a ninth aspect of the presently disclosed subject matter, there is provided a non-transitory computer readable storage medium having computer readable program code embodied therewith, the computer readable program code, executable by a processing resource to perform a method for detecting Controller Area Network (CAN) messages anomalies, the method comprising: obtaining, by a processing resource, a training set including a plurality of CAN messages associated with respective one or more vehicles, each CAN message having properties including (a) a CAN message type, (b) a size, (c) a payload, and (d) a corresponding timestamp; wherein for each CAN message type appearing in the plurality of CAN messages of the training set, the timestamps of the CAN messages of the corresponding CAN message type are derived from a stationary distribution; training a model, by the processing resource, using the training set, the model characterizing statistical relationships between one or more first types of CAN messages of respective first CAN message type and one or more second types of CAN messages each of respective second CAN message type, wherein the statistical relationships are based on one or more of the properties of the CAN messages of the training set; wherein the model is usable for identifying anomalies within a sequence of input CAN messages upon a first input CAN message of the sequence of input CAN messages, having a first CAN message type, failing to meet a given statistical relationship, of the statistical relationships, with a second input CAN message of the sequence having a second CAN message type.

In accordance with a tenth aspect of the presently disclosed subject matter, there is provided a non-transitory computer readable storage medium having computer readable program code embodied therewith, the computer readable program code, executable by a processing resource to perform a method for generating a set of rules for detecting Controller Area Network (CAN) messages anomalies, the method comprising: obtaining, by a processing resource, a training set including a plurality of CAN messages associated with respective one or more vehicles, each CAN message having properties including (a) a CAN message type, (b) a size, (c) a payload, and (d) a corresponding timestamp; learning, by the processing resource, based on the training set, statistical relationships between one or more first types of CAN messages of respective first CAN message type and one or more second types of CAN messages of respective second CAN message type, wherein the statistical relationships are based on one or more of the properties of the CAN messages of the training set; and automatically generating, by the processing resource, a set of rules, each rule of the rules defining a corresponding statistical relationship of the statistical relationships, wherein the set of rules is usable for identifying anomalies within a sequence of input CAN messages upon a first input CAN message of the sequence of input CAN messages, having a first CAN message type, failing to meet a given statistical relationship, of the statistical relationships, with a second input CAN message of the sequence of input CAN messages, having a second CAN message type.

In accordance with an eleventh aspect of the presently disclosed subject matter, there is provided a system for labeling bits, the system comprising a processing resource configured to label bits positions of each given Controller Area Network (CAN) messages type of a plurality of synchronous CAN message types as affected bits or unaffected bits based on one or more machine learning models.

In some cases, the processing resource is configured to perform the following for each given CAN message type of the plurality of synchronous CAN message types: obtain a training set including a plurality of CAN messages associated with respective one or more vehicles, each CAN message having properties including (a) a CAN message type, (b) a size, (c) a payload, and (d) a corresponding timestamp; wherein for each CAN message type appearing in the plurality of CAN messages of the training set, the timestamps of the CAN messages of the corresponding CAN message type are derived from a stationary distribution; generate a model characterizing statistical relationships between changes in first payloads of first CAN messages of one or more other CAN message types, other than the given CAN message type, and changes in second payloads of second CAN messages of the given CAN message type, wherein the first CAN messages and the second. CAN messages are part of the training set; and label each bit position in a sequence of bits comprising the second payloads, as one of the unaffected bit, upon the values of the bits positioned at the respective bit positions within the second payloads not changing in dependency to changes of the first payloads, or as one of the affected bit upon the values of the bits positioned at the respective bit positions within the second payloads changing in dependency to changes of the first payloads; thereby enabling focusing anomaly detection on affected bits.

In some cases, focusing the anomaly detection on the affected bits results in reducing false positive anomaly detections in comparison to an amount of false positive anomaly detection that is not focused on the affected bits.

In some cases, for each given CAN message type of the plurality of synchronous CAN message types, being a target CAN message type, the model is generated by: creating a training matrix wherein: each row of the training matrix represents a given target instance of a plurality of target instances of CAN messages of the given CAN message type of the training set, and comprises: a target cell representing presence of a first change between the payload of the given target instance and the payload of a preceding target instance preceding the given target instance in the target instances, if any; and source cells, each of the source cells being associated with a respective CAN message type of the CAN message types excluding the target CAN message type, wherein: upon a source instance of a plurality of source instances of CAN messages of the corresponding CAN message type being present between the target instance and the preceding target instance of the training set, the respective source cell represents presence of a second change between the payload of the given source instance and the payload of a preceding source instance preceding the given source instance in the source instances, if any; and upon the source instance of a plurality of source instances of CAN messages of the corresponding CAN message type not being present between the target instance and the preceding target instance of the training set, the respective source cell represents a non-presence; wherein the source cells in each column of the matrix represents a corresponding CAN message type and training, by a machine learning algorithm, the respective model using the training matrix, to identify the correlations between the changes in the payloads of the CAN messages of the target CAN message type, and the changes in the payloads of the CAN message type of the CAN message types excluding the target CAN message type.

In some cases, the training matrix is created so that upon presence of more than one source instance of the plurality of source instances of CAN messages of the corresponding CAN message type being present between the target instance and the preceding target instance of the training set, a plurality of additional source cells are introduced into the row, each representing a respective instance of the plurality of source instances.

In some cases, the number of additional source cells introduces into the row is limited by a threshold.

In some cases, for at least part of the CAN message type classification models, the training further includes selecting statistically significant columns of the columns of the matrix, wherein the statistically significant columns are representative of the statistical relationships.

In some cases, the processing resource is further configured to perform the following for labeling the bit positions: (a) creating a training matrix wherein each row of the training matrix represents a given instance of a plurality of instances of CAN messages of the given CAN message type of the training set whose payload changes with respect to a previous instance of the plurality of instances, and each row comprises: a target cell representing adherence of the given instance to the statistical relationships characterized by the model; and source cells comprising the bits of the payloads of the given instance located at respective bit positions associated with the source cells; (b) training the one or more machine learning models using the training matrix to identify a most influencing bit, being the bit positioned at the bit position associated with the source cell that has the highest influence on the value of the target cell; (c) calculating an accuracy score for the machine learning model; (d) removing a column of the training matrix associated with the most influencing bit; (e) labeling the bit position associated with the most influencing bit as one of the unaffected bits; (f) repeating (b) to (e) until all columns are removed from the training matrix, or until the accuracy score being below a threshold; and (g) labeling the bit positions associated with the remaining columns remaining in the training matrix, if any, as affected bits.

In some cases, the affected bits are statistically dependent on values of payloads of CAN messages of CAN message types excluding the given CAN message type.

In some cases, the unaffected bits are statistically dependent on external behaviors, external to values of payloads of CAN messages of CAN message types excluding the given CAN message type.

In some cases, the external behavior is a derived from external conditions or from a behavior of drivers of the one or more vehicles.

In some cases, the external conditions are environmental conditions.

In accordance with a twelfth aspect of the presently disclosed subject matter, there is provided a method for labeling bits, the method comprising: labeling, by a processing resource, bits positions of each given Controller Area Network (CAN) messages type of a plurality of synchronous CAN message types as affected bits or unaffected bits based on one or more machine learning models.

In some cases, the method further including the following for each given CAN message type of the plurality of synchronous CAN message types: obtaining, by the processing resource, a training set including a plurality of CAN messages associated with respective one or more vehicles, each CAN message having properties including (a) a CAN message type, (b) a size, (c) a payload, and (d) a corresponding timestamp; wherein for each CAN message type appearing in the plurality of CAN messages of the training set, the timestamps of the CAN messages of the corresponding CAN message type are derived from a stationary distribution; generating, by the processing resource, a model characterizing statistical relationships between changes in first payloads of first CAN messages of one or more other CAN message types, other than the given CAN message type, and changes in second payloads of second CAN messages of the given CAN message type, wherein the first CAN messages and the second CAN messages are part of the training set; and labeling, by the processing resource, each hit position in a sequence of bits comprising the second payloads, as one of the unaffected bit, upon the values of the bits positioned at the respective bit positions within the second payloads not changing in dependency to changes of the first payloads, or as one of the affected bit upon the values of the bits positioned at the respective bit positions within the second payloads changing in dependency to changes of the first payloads; thereby enabling focusing anomaly detection on affected bits.

In some cases, focusing the anomaly detection on the affected bits results in reducing false positive anomaly detections in comparison to an amount of false positive anomaly detection that is not focused on the affected bits.

In some cases, for each given CAN message type of the plurality of synchronous CAN message types, being a target CAN message type, the model is generated by: creating a training matrix wherein: each row of the training matrix represents a given target instance of a plurality of target instances of CAN messages of the given CAN message type of the training set, and comprises: a target cell representing presence of a first change between the payload of the given target instance and the payload of a preceding target instance preceding the given target instance in the target instances, if any; and source cells, each of the source cells being associated with a respective CAN message type of the CAN message types excluding the target CAN message type, wherein: upon a source instance of a plurality of source instances of CAN messages of the corresponding CAN message type being present between the target instance and the preceding target instance of the training set, the respective source cell represents presence of a second change between the payload of the given source instance and the payload of a preceding source instance preceding the given source instance in the source instances, if any; and upon the source instance of a plurality of source instances of CAN messages of the corresponding CAN message type not being present between the target instance and the preceding target instance of the training set, the respective source cell represents a non-presence; wherein the source cells in each column of the matrix represents a corresponding CAN message type; and training, by a machine learning algorithm, the respective model using the training matrix, to identify the correlations between the changes in the payloads of the CAN messages of the target CAN message type, and the changes in the payloads of the CAN message type of the CAN message types excluding the target CAN message type.

In some cases, the training matrix is created so that upon presence of more than one source instance of the plurality of source instances of CAN messages of the corresponding CAN message type being present between the target instance and the preceding target instance of the training set, a plurality of additional source cells are introduced into the row, each representing a respective instance of the plurality of source instances.

In some cases, the number of additional source cells introduces into the row is limited by a threshold.

In some cases, for at least part of the CAN message type classification models, the training further includes selecting statistically significant columns of the columns of the matrix, wherein the statistically significant columns are representative of the statistical relationships.

In some cases, the method includes the following for labeling the bit positions: (a) creating a training matrix wherein each row of the training matrix represents a given instance of a plurality of instances of CAN messages of the given CAN message type of the training set whose payload changes with respect to a previous instance of the plurality of instances, and each row comprises: a target cell representing adherence of the given instance to the statistical relationships characterized by the model; and source cells comprising the bits of the payloads of the given instance located at respective bit positions associated with the source cells; (b) training the one or more machine learning models using the training matrix to identify a most influencing bit, being the bit positioned at the bit position associated with the source cell that has the highest influence on the value of the target cell; (c) calculating an accuracy score for the machine learning model; (d) removing a column of the training matrix associated with the most influencing bit; (e) labeling the bit position associated with the most influencing bit as one of the unaffected bits; (f) repeating (b) to (e) until all columns are removed from the training matrix, or until the accuracy score being below a threshold; and (g) labeling the bit positions associated with the remaining columns remaining in the training matrix, if any, as affected bits.

In some cases, the affected bits are statistically dependent on values of payloads of CAN messages of CAN message types excluding the given CAN message type.

In some cases, the unaffected bits are statistically dependent on external behaviors, external to values of payloads of CAN messages of CAN message types excluding the given CAN message type.

In some cases, the external behavior is a derived from external conditions or from a behavior of drivers of the one or more vehicles.

In some cases, the external conditions are environmental conditions.

In accordance with a thirteenth aspect of the presently disclosed subject matter, there is provided a non-transitory computer readable storage medium having computer readable program code embodied therewith, the computer readable program code, executable by a processing resource to perform a method for generating a set of rules for detecting Controller Area Network (CAN) messages anomalies, the method comprising: labeling, by a processing resource, bits positions of each given Controller Area Network (CAN) messages type of a plurality of synchronous CAN message types as affected bits or unaffected bits based on one or more machine learning models.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1:
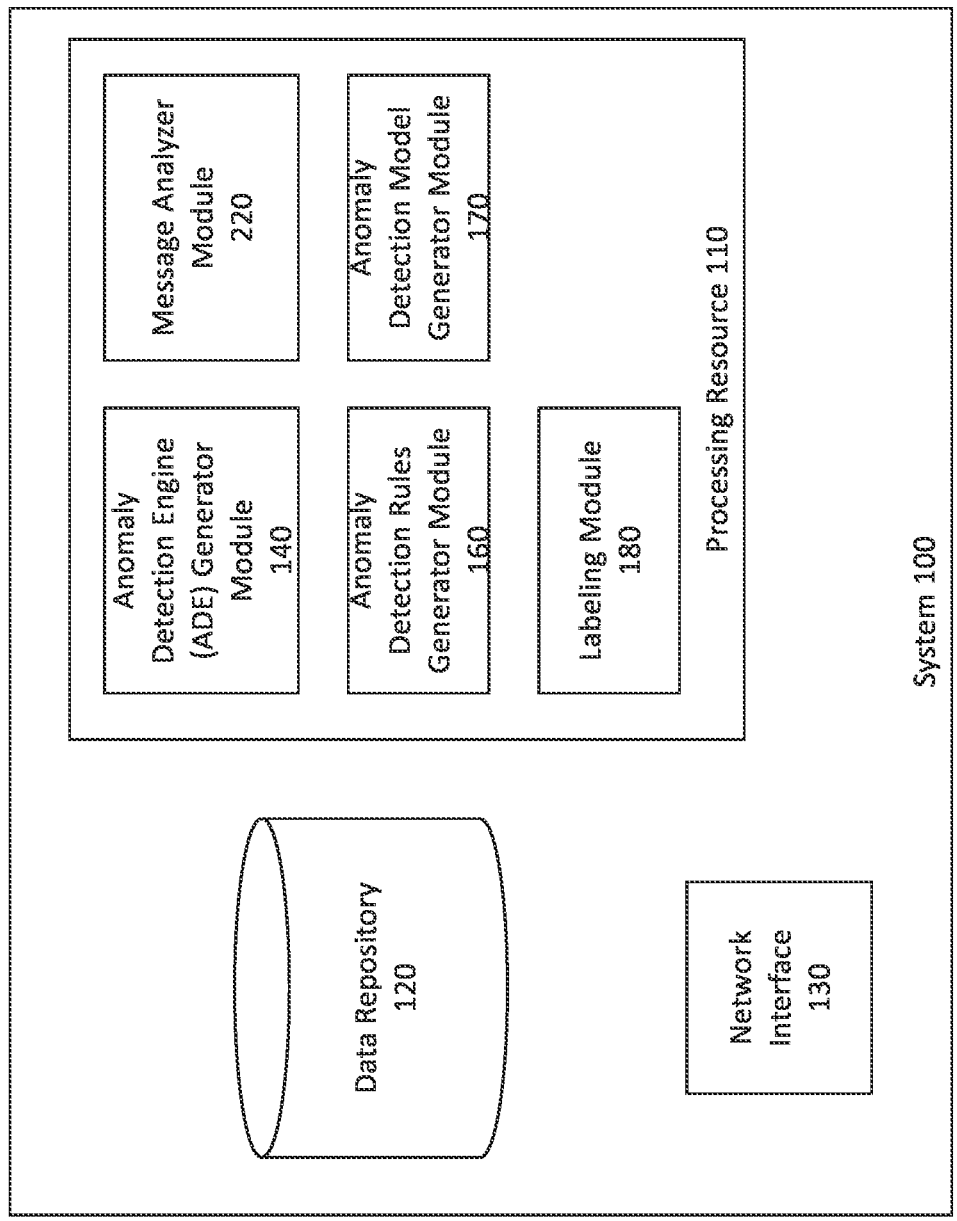
FIG. 1 is a block diagram schematically illustrating one example of a system for generating an Anomaly Detection Engine (ADE) for Controller Area Network (CAN) messages, in accordance with the presently disclosed subject matter.

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "obtaining", "learning", "training", "generating", "receiving", "classifying", "performing", "creating", "labeling" or the like, include action and/or processes of a computer that manipulate and/or transform data into other data, said data represented as physical quantities, e.g. such as electronic quantities, and/or said data representing the physical objects. The terms "computer", "processor", and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field programmable gate array (FPGA), an application specific integrated circuit (ASIC), etc.), a Graphics Processing Unit (GPU), a group of multiple physical machines sharing performance of various tasks, virtual servers co-residing on a single physical machine, any other electronic computing device, and/or any combination thereof.

The operations in accordance with the teachings herein may be performed by a computer specially constructed for the desired purposes or by a general-purpose computer specially configured for the desired purpose by a computer program stored in a non-transitory computer readable storage medium. The term "non-transitory" is used herein to exclude transitory, propagating signals, but to otherwise include any volatile or non-volatile computer memory technology suitable to the application.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiments) is included in at least one embodiment of the presently disclosed subject matter. Thus, the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 2:
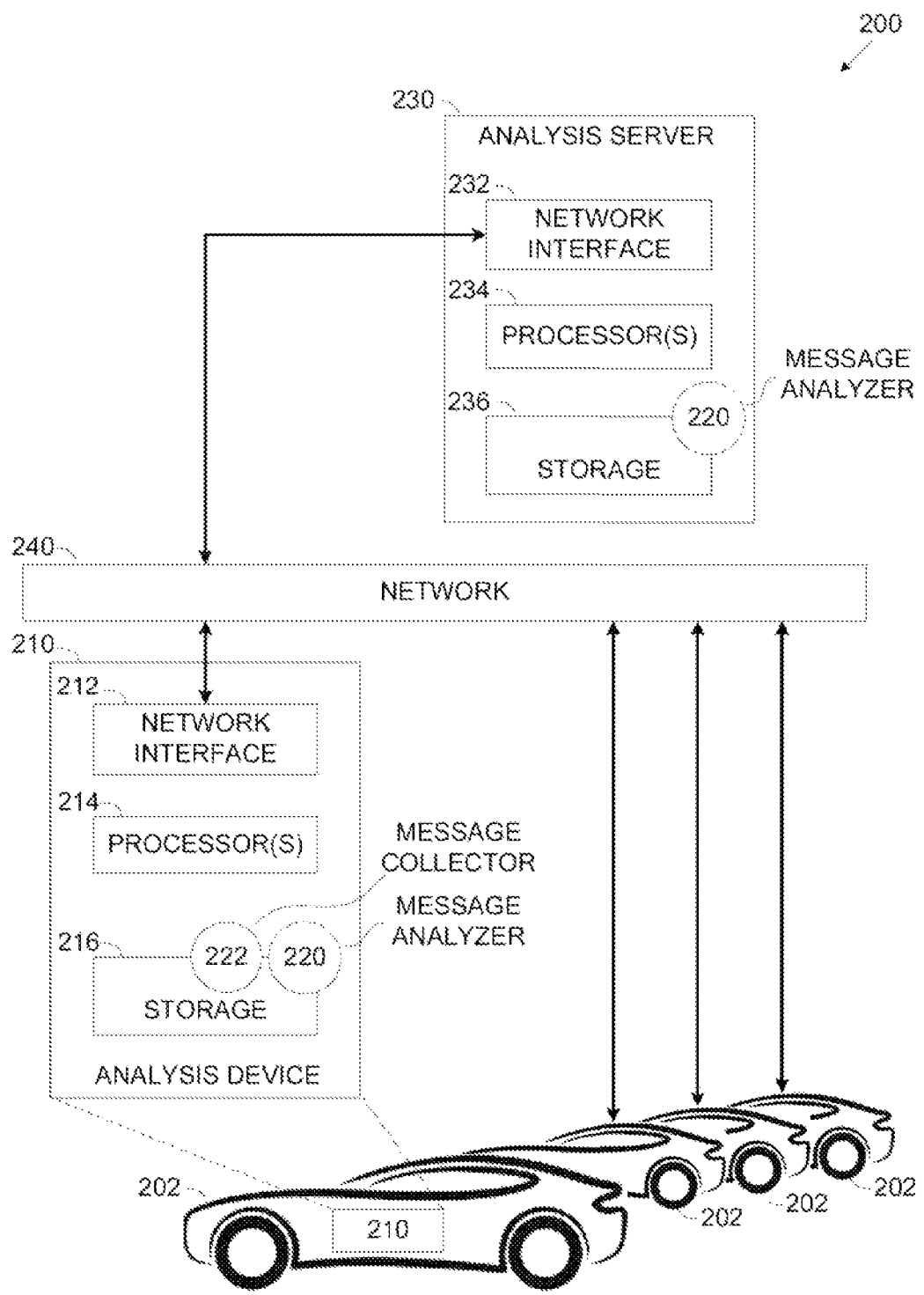
FIG. 2 is a schematic illustration of an exemplary system for identifying an abnormal event in an operational environment of a vehicle, in accordance with the presently disclosed subject matter.
Figure 3:
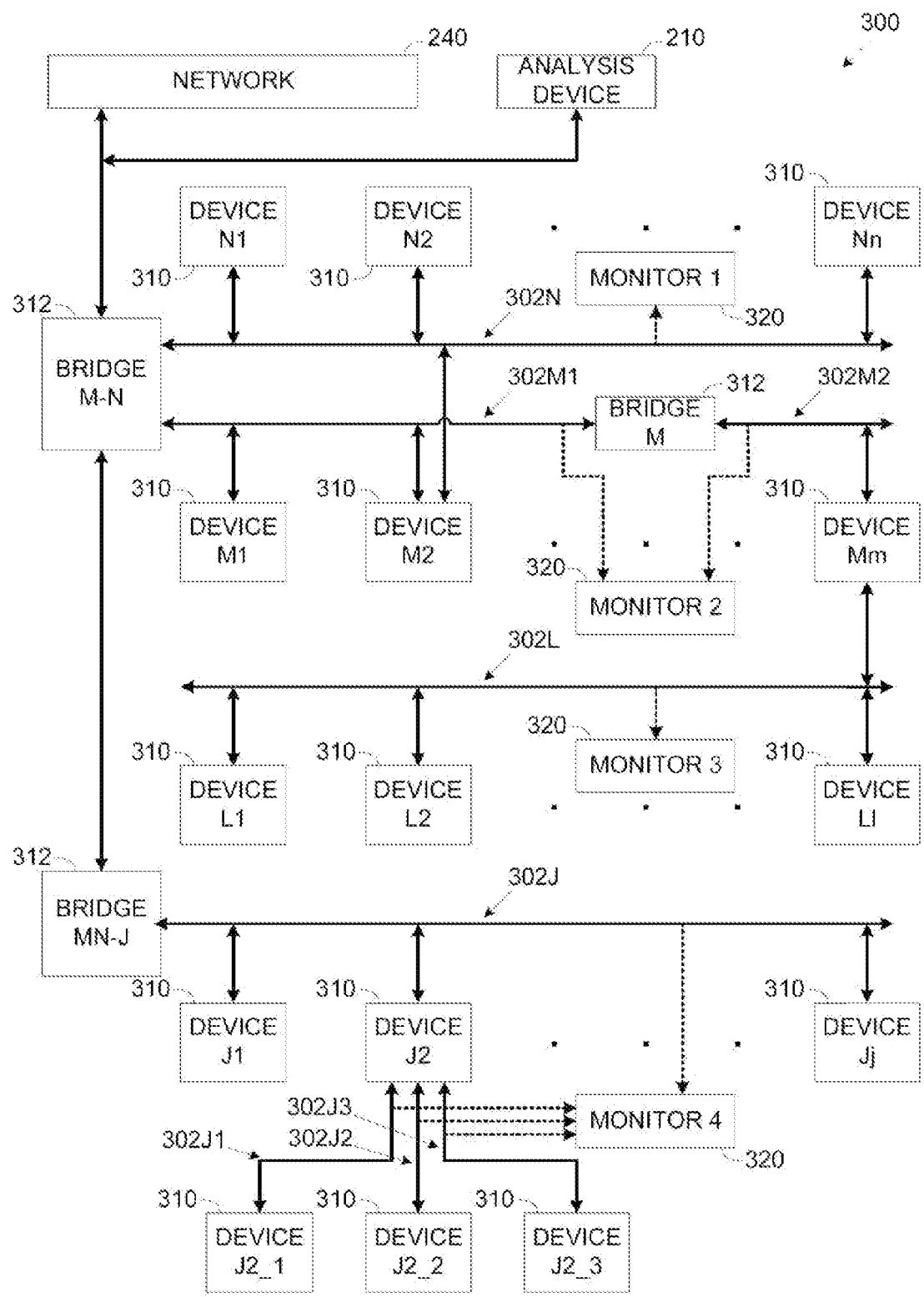
FIG. 3 is a schematic illustration of an exemplary system for intercepting communication messages exchanged over communication channels of a vehicle, in accordance with the presently disclosed subject matter.

In embodiments of the presently disclosed subject matter, fewer, more and/or different stages than those shown in FIGS. 4-10 may be executed. In embodiments of the presently disclosed subject matter one or more stages illustrated in FIGS. 4-10 may be executed in a different order and/or one or more groups of stages may be executed simultaneously. FIGS. 1-3 illustrate a general schematic of the system architecture in accordance with an embodiment of the presently disclosed subject matter. Each module in FIGS. 1-3 can be made up of any combination of software, hardware and/or firmware that performs the functions as defined and explained herein. The modules in FIGS. 1-3 may be centralized in one location or dispersed over more than one location. In other embodiments of the presently disclosed subject matter, the system may comprise fewer, more, and/or different modules than those shown in FIGS. 1-3.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Bearing this in mind, attention is drawn to FIG. 1, a block diagram schematically illustrating one example of a system for generating an Anomaly Detection Engine (ADE) for Controller Area Network (CAN) messages, in accordance with the presently disclosed subject matter.

According to certain examples of the presently disclosed subject matter, there is provided a system 100 configured to identify anomalies within CAN messages. It is to be noted that whenever reference is made to CAN messages, any type of CAN messages that meet the CAN bus protocol, or any extension thereof is contemplated, including, for example, CAN FD (CAN with Flexible Data-Rate), or any other type of CAN messages.

For this purpose, System 100 can comprise, or be otherwise associated with, a data repository 120 (e.g. a database, a storage system, a memory including Read Only Memory—ROM, Random Access Memory—RAM, or any other type of memory, etc.) configured to store data, including, inter alia, one or more training sets usable for generating a plurality of models forming part of the ADE, while each training set includes a plurality of CAN messages that represent valid operation of a vehicle. In some cases, the data repository 120 can also store the ADE generated by the system, e.g. for distributing it to vehicles on which it is to operate and/or for executing it when system 100 receives CAN messages for classification as anomalous or not.

System 100 can comprise a network interface 130 enabling connecting system 130 to various networks such as the Internet and enabling it to send and receive data sent thereto via the networks. As further detailed herein, in some cases, system 100 can be requested to classify messages intercepted on one or more vehicles as anomalous or not.

System 100 further comprises a processing resource 110. Processing resource 110 can include one or more processing units (e.g. central processing units, Graphics Processing Units (GPUs)), microprocessors, microcontrollers (e.g. microcontroller units (MCUs)), or any other computing processing device, which are adapted to independently or cooperatively process data for controlling relevant system 100 resources and for enabling operations related to system 100 resources.

The processing resource 110 comprises an Anomaly Detection Engine (ADE) generator module 140 and/or an anomaly detection rules generator module 160 and/or an anomaly detection model generator module 170 and/or labeling module 180. The processing resource 110 can further comprise a message analyzer module 220.

Figure 4:
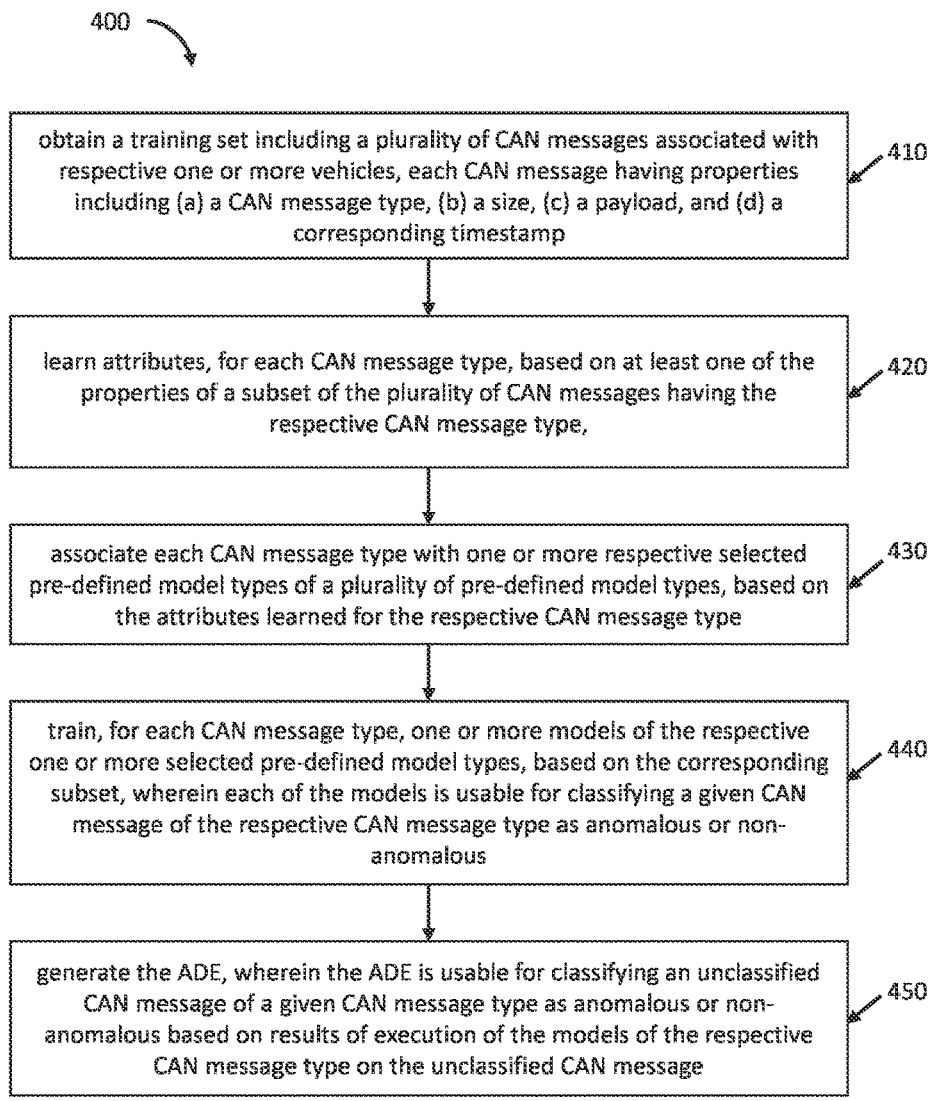
FIG. 4 is a flowchart illustrating one example of a sequence of operations carried out for generating an Anomaly Detection Engine (ADE) for Controller Area Network (CAN) messages, in accordance with the presently disclosed subject matter.

According, to some examples of the presently disclosed subject matter, anomaly detection engine generator module 140 is configured to generate the ADE, as further detailed herein, with reference to FIG. 4. Anomaly detection rules generator module 160 is configured to generate rules for detecting CAN messages anomalies, as further detailed herein, inter alia with reference to FIG. 6. Anomaly detection model generator module 170 is configured to generate a model for detecting CAN messages anomalies, as further detailed herein, inter alia with reference to FIG. 8. Message analyzer module 220 is configured to analyze a CAN message or a CAN message sequence and classify the CAN message, or the CAN messages sequences as anomalous or not, as further detailed herein, inter alia with reference to FIGS. 2, 5, 7, and 9.

Figure 10:
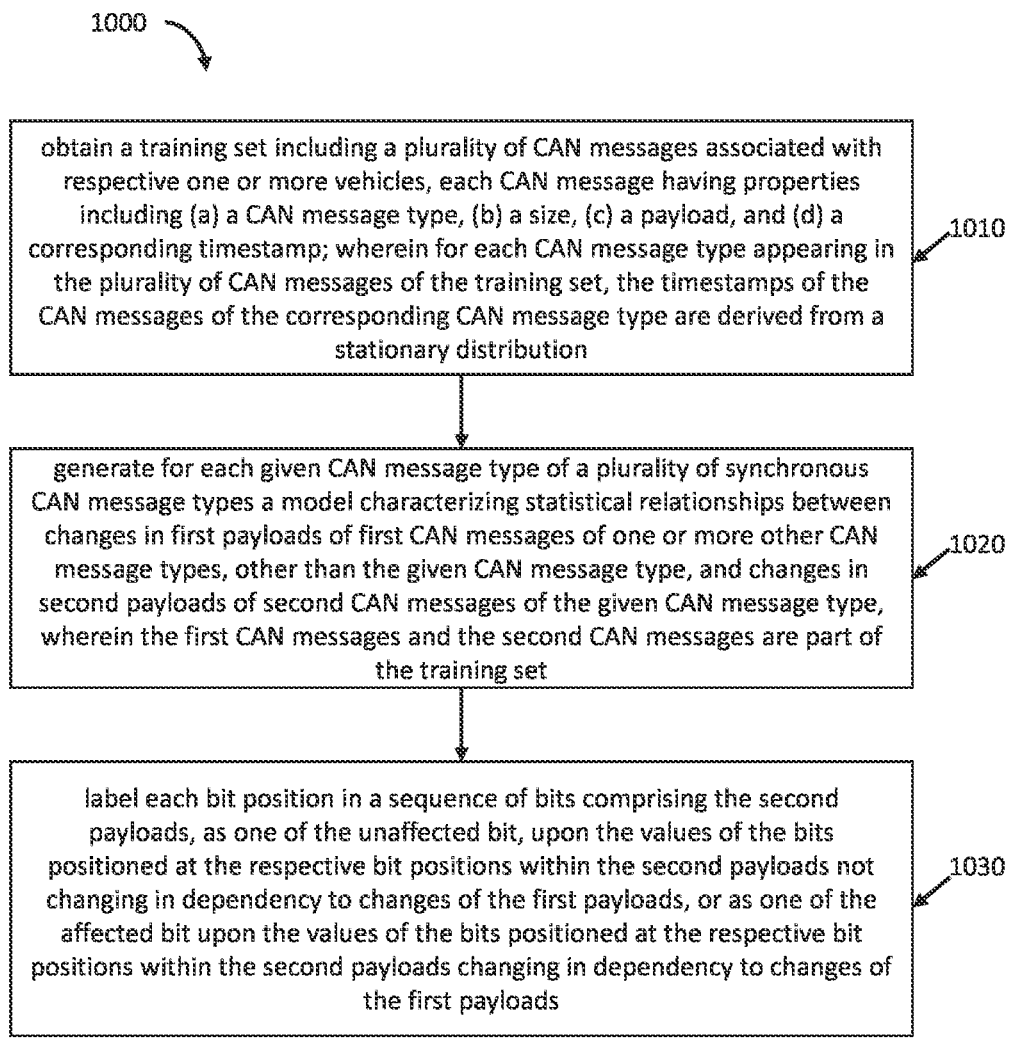
FIG. 10 is a flowchart illustrating one example of a sequence of operations carried out for labeling bit positions of Controller Area Network (CAN) message types, in accordance with the presently disclosed subject matter.

According to some examples of the presently disclosed subject matter, labeling module 180 is configured to label bit positions of Controller Area Network (CAN) message types as affected bits or as unaffected bits, as further detailed herein, inter alia with reference to FIG. 10.

Turning to FIG. 2, there is shown a schematic illustration of an exemplary system for identifying an abnormal event in an operational environment of a vehicle, in accordance with the presently disclosed subject matter.

An exemplary system 200 may include one or more vehicles 202 such as, a car, a truck, a motorcycle, a bus, a train, an airplane, a drone, a boat, and/or the like. According to some embodiments of the presently disclosed subject matter one or more of the vehicles 202 includes a respective analysis device 210 adapted to execute one or more processes for detecting anomalies, as further detailed herein, inter alia with reference to FIGS. 5, 7 and 9. However, according to some embodiments of the presently disclosed subject matter the processes for detecting anomalies are executed by a remote analysis server 230 (that can optionally be system 100) for one or more vehicles 202. In such cases, the data for analysis can be stored on a removable storage device of the vehicles 202 and provided to the remote analysis server 230 occasionally, by removing the removable storage device from the vehicles 202 and exporting the data to remote analysis server 230 (e.g. by connecting it to the remote analysis server 230 and copying the data). In other cases, the vehicles 202 can be operatively connected to the analysis server 230 via a network 240 comprising one or more wired and/or wireless networks, for example, a Radio Frequency (RF) link, a LAN, a WLAN, a Wide Area Network (WAN), a Municipal Area Network (MAN), a cellular network, the internet and/or the like, which enables the vehicles 202 to send the data to the remote analysis server 230 via the network. The connection can be a real time connection through which CAN messages intercepted on the vehicle's 202 communication channels are immediately sent to the remote analysis server 230. Optionally, in some embodiments, the connection can be a non-real-time connection so that CAN messages intercepted on the vehicle's 202 communication channels are stored on a buffer and sent to the remote analysis server 230 periodically, in cases where one or more vehicles 202 are not continuously connected to the remote analysis server 230 but rather connect to the remote analysis server 230 occasionally, periodically and/or the like. For example, a certain vehicle 202 may connect to the remote analysis server 230 when parked in a certain parking space, for example, at home, at a work place and/or the like. Moreover, a certain vehicle 202 may take advantage of networking capabilities and/or infrastructures provided by the parking space, for example, connectivity to the network 240. In such case, the certain vehicle 202 may connect to the parking space network infrastructure, for example, a wireless router (e.g. Wi-Fi router) serving as a gateway to provide access to the network 240 and through it to the analysis server 230.

The analysis device 210 may include a network interface 212 to provide connectivity for the vehicle 202, a processor(s) 214 for executing one or more processes for detecting anomalies, and storage 216 for storing program code (serving as program store program store) and/or data. The network interface 212 may include one or more wired and/or wireless network interfaces for connecting to the network 240. The processor(s) 214, homogenous or heterogeneous, may include one or more processing nodes arranged for parallel processing, as clusters and/or as one or more multi core processor(s). The storage 216 may include one or more non-transitory memory devices, either persistent non-volatile devices, for example, a hard drive, a solid-state drive (SSD), a magnetic disk, a Flash array and/or the like and/or volatile devices, for example, a Random-Access Memory (RAM) device, a cache memory and/or the like.

The processor(s) 214 may execute one or more software modules, for example, a process, a script, an application, an agent, a utility, a tool and/or the like each comprising a plurality of program instructions stored in a non-transitory medium such as the storage 216 and executed by one or more processors such as the processor(s) 214. For example, the processor(s) 214 may execute a message analyzer module 220 for executing one or more processes for detecting anomalies, and for acting accordingly. Additionally, or alternatively, the processor(s) 214 may execute a labeling module 180 for executing one or more processes for labeling bit positions of CAN message types.

In case the process/es for detecting anomalies and/or for labeling bits are executed by the remote analysis server 230, the processor(s) 214 may execute a message collector module 222 for collecting intercepted messages exchanged over one or more communication channels of the vehicle 202. The message collector 222 may further transmit the intercepted messages and/or part thereof to the remote analysis server 230 via the network interface 212 connected to the network 240. In some cases, in order to differentiate between the different vehicles 202, the vehicles 202 Vehicle Identification Numbers (VINs) are used.

The remote analysis server 230 may include a network interface 232 such as the network interface 212 or network interface 130 to provide connectivity for the remote analysis server 230, a processor(s) 234 such as the processor(s) 214 or processing resource 110 for executing processes such as the processes for detecting anomalies and storage 236 such as storage 216 or data repository 120 for storing program code (serving as program store program store) and/or data. Similarly to the storage 216 and data repository 120, the storage 236 may include one or more non-transitory memory devices, either persistent non-volatile devices, for example, a hard drive, a solid state drive (SSD), a magnetic disk, a Flash array and/or the like and/or volatile devices, for example, a Random-Access Memory (RAM) device, a cache memory and/or the like. The storage 236 may further comprise one or more network storage devices, for example, a storage server, a network accessible storage (NAS), a network drive, and/or the like.

The processor(s) 234 may execute one or more software modules, for example, a process, a script, an application, an agent, a utility, a tool and/or the like. For example, the processor(s) 234 may execute an analyzer module such as the analyzer 220 for executing the processes for detecting anomalies and taking action accordingly. Additionally, or alternatively, the processor(s) 234 may execute a labeling module 180 for executing one or more processes for labeling bit positions of CAN message types.

Optionally, the remote analysis server 230 and/or the analyzer 220 and/or the labeling module 180 executed by the remote analysis server 230 are provided, partially, or entirely, as one or more cloud computing services, for example, infrastructure as a Service (IaaS), Platform as a Service (PaaS), Software as a Service (SaaS) and/or the like such as, for example, Amazon Web Service (AWS), Google Cloud, Microsoft Azure, IBM Cloud, and/or the like.

Reference is now made to FIG. 3, which is a schematic illustration of an exemplary system for intercepting communication messages exchanged over communication channels of a vehicle, in accordance with the presently disclosed subject matter.

An exemplary system 300 may be deployed in a vehicle such as the vehicle 202 for intercepting messages exchanged between a plurality of devices 310 deployed in the vehicle 202 for collecting data relating to the operation of the vehicle 202 and/or for controlling one or more functions and or systems of the vehicle 202. The devices 310 may include for example, sensor(s), ECU(s), I/O controller(s), communication controller(s) and/or the like. The topology and deployment of the system 300 is exemplary and should not be construed as limiting since multiple other deployments, topologies and/or layouts may be implemented as known in the art.

The sensors may include one or more sensors, for example, an engine operation sensor, an environmental condition sensor (e.g. temperature sensor, a light sensor, a humidity sensor, etc.), a navigation sensor (e.g. a Global Positioning System (GPS) sensor, an accelerometer, a gyroscope, etc.), an imaging sensor (e.g. a camera, a night vision camera, a thermal camera, etc.) and/or the like. The ECUs may include one or more processing units and/or controllers adapted to operated, control and/or execute one or more functions of the vehicle 202, for example, steering, accelerating, breaking, parking, information collection, safety system control, multimedia system control, door control, window control and/or the like. The I/O controllers may include one or more controllers adapted to connect to one or more of the sensors, the ECUs and/or the like. The I/O controllers may include one or more controllers adapted to operate one or more user interfaces, for example, a pointing device, a keyboard, a display, an audio interface and/or the like. The communication controllers may include one or more controllers adapted to connect to the network 240. Optionally, one or more of the devices 310 may be integrated devices comprising one or more of the sensors, the ECUs, the I/O controllers, the communication controllers and/or the like.

The devices 310 may communicate with each other by sending messages over one or more wired and/or wireless (vehicle) communication channels 302 deployed in the vehicle 202, for example, CAN bus, LIN, FlexRay, LAN, Ethernet, automotive Ethernet, WLAN (e.g. Wi-Fi), WCAN, MOST and/or the like. The topology of the system may vary and may include a plurality of communication channels 302 of various types and various topologies (e.g. bus, point-to-point, multi-drop, etc.) which may be further segmented. By deploying specific types of communication channels 302 and optionally segmenting one or more of them, the topology of the system 300 may be adapted to accommodate one or more needs, constraints and/or objectives of the system 300, for example, apply segregated domain(s) for sensitive devices 310, adapt to deployment physical limitation(s) of the vehicle 202 (e.g. limited space, long distances, etc.), create a hierarchical structure(s) for at least some of the devices 310 and/or the like.

For example, one or more devices 310, for example, a device 310 N1, a device 310 N2 through device 310 Nn may connect to a communication channel 302N, for example, a LIN. In another example, one or more devices 310, for example, a device 310 M1, a device 310 M2 through device Mm may connect to a segmented communication channel 302M, for example, a CAN bus comprising two CAN bus segments 302M1 and 302M2. In another example, one or more devices 310, for example, a device 310 L1, a device 310 L2 through device 310 L1 may connect to a communication channel 302L, for example, a MOST. In another example, one or more devices 310, for example, a device 310 J1, a device 310 J2 through a device 310 Jj may connect to a communication channel 302J, for example, a Wi-Fi network.

The system 300 may further include one or more bridges 312 adapted to connect between communication channels 302 of different types and/or between segments of one or more of the communication channels 302. The bridges 312 may transfer one or more messages from one communication channel 302 to another communication channels 302 in one or both directions to allow propagation of messages between the communication channels 302. Naturally, each bridge 312 includes the appropriate interfaces and/or ports for connecting to the respective communication channels 302 it connects to. For example, a bridge 312 M-N may connect the communication channel 302N and the communication channel 302M. In another example, a bridge 312 MN-J may connect the communication channels 302N and 302M with the communication channels 302J. In another example, a bridge 312 M may connect between the segments 302M1 and 302M2 of the communication channels 302M.

One or more of the devices 310 may also serve as a bridge 312. For example, the device 310 Mm may bridge between the communication channel 302M, specifically the segment 302M2 of the communication channel 302M and the communication channel 302L. In another example, the device 310 J2 may serve as a bridge 312 for connecting a device 310 J2_1, a device 310 J2_2 and/or a device 310 J2_3 to the communication channel 302J where the device 310 J1 connects to the device 310 J2 through a communication channel 302 J1, the device 310 J2 connects to the device 310 J2 through a communication channel 302 J2 and the device 310 J3 connects to the device 310 J2 through a communication channel 302 J3. The communication channels 302 J1, 302 J2 and/or 302 J2 may be of the same type and/or of different types.

The system 300 may further include one or more monitoring devices 320 for monitoring and intercepting communication, specifically messages exchanged between the devices 310 over the communication channels 302. The system 300 may include a central monitor 320 which may connect to a plurality of the communication channels 302. However, the system 300 may include a plurality of monitors 320, for example, a monitor 1 320 which monitors the communication channel 302N, a monitor 2 320 which monitors the communication channel 302M specifically the segments 302M1 and 302M2, a monitor 3 320 which monitors the communication channel 302L, a monitor 4 320 which monitors the communication channel 302J and/or the like. The monitor 4 320 may further monitor one or more of the communication channels 302J1, 302J2 and/or 302J3. One or more of the monitors 320 may be integrated in one or more of the devices 310 and/or the bridges 312 such that in addition to its normal operation the integrated device 310 or the integrated bridge 312 may monitor and intercept messages transmitted on the respective communication channel(s) 302 it connects to. According to some embodiments of the present invention, the monitors 320 are receive-only devices which are only capable of intercepting (receiving) the messages transmitted on the communication channel(s) 302 while unable to transmit messages or affect the communication channel(s) 302 in any way. However, in some cases, one or more of the monitors 320 may optionally be configured as active devices that can inject data to the communication channels (or to parts thereof), or manipulate data injected therethrough to the communication channels. This can enable, for example, correcting anomalous messages, preventing anomalous messages from being transmitted over the designated communication channels, etc.

The monitoring device(s) 320 adapted to intercept the messages exchanged over the communication channels 302 may optionally be configured as passive receiver-only device incapable of injecting data to the communication channels 302. Furthermore, the monitoring device(s) 320 may be coupled to the communication channels 302 in an isolated manner thus incapable of inducing, altering, manipulating and/or otherwise affecting the transmission signals of the communication channels 302 in any way. For example, one or more of the monitoring devices 320 may include one or more sensing wires wrapped around one or more insulated wires of one or more of the communication channels 302 such that the sensing wire(s) are incapable of injecting data, messages and/or signals to the communication channel(s) 302. By analyzing the electric load, current and/or voltage of the signals traveling (propagating) through the insulated wires of the communication channel(s) 302 as sensed by the sensing wire(s), the monitoring device(s) 320 may detect messages exchanged over the communication channel(s) 302 and intercept them. In another example, one or more of the monitoring devices 320 may include a wireless receiver-only capable of intercepting wireless messages exchanged between one or more of the devices 210 while incapable of transmitting messages.

In order to be able to correlate the intercepted messages with time and/or space attributes, the monitoring device(s) 320 may assign metadata to one or more of the intercepted messages which may naturally be intercepted at different communication channels 302 at different times. The metadata assigned to the intercepted message(s) may include, for example, a time tag indicating a time of interception of the respective message, a source communication channel 302 where the respective message is intercepted and/or the like. The metadata assigned to the intercepted messages may be used to correlate messages intercepted at various times and/or locations (communication channels 302) to create one or more time continuum and/or space continuum meta-events.

The intercepted messages may be transferred (exported) to the analysis server 230 and/or to the analysis device 210 for analysis.

One or more of the devices 310 may be adapted to control a network interface such as the network interface 212 for connecting to a network such as the network 240 to transmit the intercepted messages to the analysis server 230.

The system 300 may further include an analysis device such as the analysis device 210 which may receive the intercepted messages from the monitor(s) 320.

Turning to FIG. 4, there is shown a flowchart illustrating one example of a sequence of operations carried out for generating an Anomaly Detection Engine (ADE) for Controller Area Network (CAN) messages, in accordance with the presently disclosed subject matter.

According to the presently disclosed subject matter, the Anomaly Detection Engine (ADE) generator module 140 can be configured to perform an anomaly detection engine generation process 400, during which it is configured to generate an ADE usable for identifying one or more anomalous CAN messages during operation of a vehicle 202. Before turning to describe the ADE generation process 400, it is to be noted that although reference is made herein to vehicles CAN messages, this is by no means limiting, and the teachings herein can be applied to other types of messages that are transmitted over any of the communications channel(s) 302 of the vehicle 202, and optionally also on other, non-vehicular environments, mutatis mutandis.

For the purpose of generating the ADE, the ADE generator module 140 obtains a training set including a plurality of CAN messages associated with respective one or more vehicles 202, each CAN message having properties including (a) a CAN message type (noting that in the CAN bus protocol the message type is also referred to as "arbitration ID", or as a Message Identifier (MID)), (b) a size, (c) a payload, and (d) a corresponding timestamp (block 410). The CAN messages of the training set can be obtained from real-time recordings of CAN messages generated during vehicle rides of vehicles 202 (e.g. using message collectors 222 of vehicles 202 that intercepts CAN messages transmitted over the vehicles 202 CAN bus) and/or from simulations of vehicle rides and/or from any other source, as long as the CAN messages of the training set represent valid operation of the vehicle 202, or at least an assumed valid operation thereof.

It is to be noted that the structure of the CAN messages is defined by known standards. However, each manufacturer defines its own semantic for the messages, without which the relationship between the various types of messages and payloads on the one hand and the respective vehicle functionality—is unknown. Accordingly, it is desirable to train the ADE using a training set that is based on semantic of CAN messages in the environment on which the ADE is designed to operate. The training set therefore includes CAN messages that are associated with a common semantic.

In other words, the training set is obtained from vehicles 202, or simulations, that generate, at identical scenarios, messages having the same type, size and payload as messages that are generated by vehicles 202 on which the ADE is designed to operate (e.g. vehicles of the same make and model as the vehicle 202 on which the ADE is designed to operate). For example, if a vehicle 202 on which the ADE is designed to operate generates a message of type X, size Y and payload Z when the left turn signal is turned on, the training set is required to include a message of the same type X, same size Y and same payload Z to represent turning on a left turn signal.

Having said that, it is to be noted that the ADE generator module 140 itself is not required to, and in some implementations does not, have knowledge of the fact that a message of type X, size Y and payload Z represents turning on the left turn signal. More generally, in some cases, the relationship between the CAN message type and a respective functionality of the vehicles 202 (i.e. the semantic of the CAN message) is unknown to the ADE generator module 140.

ADE generator module 140 learns attributes for each CAN message type, based on at least one of the properties (the sizes, the payloads, the timestamps) of a subset of the plurality of CAN messages having the respective CAN message type (block 420).

Assuming that the training set includes CAN messages of several types, ADE generator module 140 groups the CAN messages of the training set into groups by their message type. Attributes are learned for each group, based on the sizes and/or the payloads and/or the timestamps of the CAN messages within the group.

The ADE generator module 140 can attempt to learn an attribute that is based on an inter arrival time of the CAN messages of the same message type. In this case, the attribute can be: synchronicity of the CAN messages of the subset when the inter arrival time is derived from a stationary distribution; a-synchronicity of the CAN messages of the subset when the inter arrival time is derived from a non-stationary distribution; or hybridity in which: (a) only part (and optionally a majority) of the CAN messages of a given group demonstrate synchronicity (so that the inter arrival time is derived from a stationary distribution), while at least one of the CAN messages of the same given group is not synchronized as the part of the group that demonstrates synchronicity (i.e. the inter arrival time thereof is derived from a non-stationary distribution), and/or (b) several distinct sub-groups of the CAN messages of a given group demonstrate independent synchronicity but the shifting times between the sub-groups can depend on other properties of the CAN messages of the given group, other than the timestamp.

Looking at an example, to learn if CAN messages of a given CAN message type have an attribute of synchronicity, the ADE generator module 140 searches for stationarity of the underlying distribution of interarrival time based on the timestamps of the CAN messages of the given CAN message type and tests their consistency over time. That is, considering large enough batches of data (at least hundreds of CAN messages of the given CAN message type), the ADE generator module 140 checks the similarity between the underlying histograms of data, and accordingly increases batch size, or otherwise, given satisfactory results (i.e. results of similarity tests between the given distributions are above a similarity threshold, and/or examining the consistency of relative percentiles to rule out existence of outliers with a likelihood below a given likelihood threshold, generated by an unlearned process) continues to check stationarity against new derived hatches of data (noting that such check can result in a change of classification of the CAN messages of a given CAN message type as having an attribute of synchronicity). Specifically, for example, in case of CAN messages of the given CAN message type have an attribute of synchronicity all parts of the distribution (percentiles) are required to show a predictable behavior, up to a pre-defined noise threshold of sampling noise.

In a more specific example, assuming that timestamps of CAN messages of a given CAN message type have a gaussian distribution where the probability of p-0.99 is found within the range of interarrival values of ~1 second and ~2 seconds, such CAN message type can have a synchronicity attribute, so that one can expect the interarrival time between CAN messages of the given CAN message type to be between ~1 second and ~2 seconds in 99% of the samples of CAN messages of the given CAN message type.

In addition, or alternatively, to the attribute that is based on an inter arrival time, the ADE generator module 140 can attempt to learn an attributed that is based on a boundedness of the payloads, or parts thereof, of the CAN messages of the same message type. In this case, the attribute can be: (a) boundness upon the number of identified unique values of payloads of the CAN messages of the subset being bounded (i.e. identifying that there is a finite number of values within payloads of the CAN messages of the subset); or (b) un-boundness upon the number of identified unique values of payloads of the CAN messages of the subset being unbounded (i.e. identifying that there is a continuously increasing number of unique values within payloads of the CAN messages of the subset).

For example, CAN messages representing the Vehicle identification Number (VIN), which is a unique identifier of the vehicle, constantly shows a single value and hence is considered bounded. On the contrary, CAN messages associated with a vehicle's mileage counter continuously shows new payload patterns over time and is considered unbounded.

It is to be noted that additional attributes be learned, such as an average rate of change (i.e. activity level) of the payload of the CAN messages of the subset; or any other attribute that can be learned.

Looking at the average rate of change, for example, if we look at CAN messages of a given CAN message type, the average rate of change is determined by detecting the time at which the values of the payloads of the CAN messages of the given CAN message type changed.

Having learned attributes in groups of CAN messages (each group comprising CAN messages of identical CAN message type), ADE generator module 140 associates each CAN message type with one or more respective selected pre-defined model types of a plurality of candidate pre-defined model types, based on the attributes learned for the respective CAN message type (block 430).

Some of the candidate pre-defined model types support modeling of stationarity signals, and some of the candidate pre-defined model types support modeling of non-stationarity signals (noting that non-stationary signals can be a result of an external agent (e.g. a driver of a vehicle on which the CAN messages are intercepted)) under the realm of unsupervised learning paradigms. To this end, ADE generator module 140 can utilize one or more of the following modeling concepts: targeting classification, feature selection, outliers' detection, learning stationarity properties, and more. ADE generator module 140 can utilize, amongst others, deep learning approach such as: Deep belief networks, Restricted Boltzman Machine networks (RBMs), Mixture Density Networks (MDNs), Various embedding techniques including tSNE (t-distributed Stochastic Neighbor Embedding), Recurrent Neural Networks (RNN), Autoencoders, Variational Autoencoders, and various Language-based models. In addition, ADE generator module 140 can use various traditional machine learning algorithms including one or more of: boosting techniques or generally different ensembles-based modeling (e.g. Random Forest, Rotational Forest), a Support Vector Machine (SVM), a One Class SVM, a context tree, a Logistic Regression, and models of learning with noise. In some cases, control schemes such as CUSUM (cumulative sum) and EWMA (Exponentially Weighted Moving Average) can be employed as well.

It is to be noted in this respect that some types of models are more suitable to classify CAN messages of certain types that have certain attributes than other types of models. For example, a given pre-defined candidate model type may be suitable to classify a first type of CAN messages that has a synchronicity attribute and a boundedness of its payload's values attribute, while another pre-defined candidate model type may be suitable for classifying a second type of CAN messages that has an a-synchronicity attribute and a non-boundedness of its payload's values attribute.

As indicated herein, in some cases, the relationship between the CAN message type and a respective functionality of the vehicles 202 (i.e. the semantic of the CAN message) is unknown to the ADE generator module 140. However, in other cases, the ADE generator module 140 may have information of relationships between at least part of the CAN message types and respective functionalities of the vehicles 202. In such cases, having such information can enable associating CAN messages of such CAN message types (known to be related to a known vehicle 202 functionality) to pre-defined candidate models bases on such knowledge, whether additionally, or alternatively, to the knowledge of the attributes of the CAN messages of such CAN message types of the training set.

ADE generator module 140 trains, for each CAN message type, one or more models of the respective one or more selected pre-defined model types associated with the respective CAN message type as described with reference to block 430 (block 440). Each model can be trained using a corresponding subset of CAN messages of the training set, the subset being those CAN messages of the training set that are of the respective CAN message type associated with the corresponding model. Each of the trained models trained at block 440 is usable for classifying a given CAN message of the respective CAN message type as anomalous or non-anomalous.

It is to be noted that in some cases, some of the trained models are not valuable for the purpose of classifying CAN messages of the respective CAN message type, and such models can be excluded so that they are not used to classify CAN messages of the respective CAN message type. For example, in case of context-based anomaly detection (e.g. N-Gram model), when all combinations of the payload sequence are normally included, there is no value for such model for anomaly detection.

Looking at an example, assuming that as a result of executing block 430 messages of type X are associated with models of types A, B and C. At block 440, three models are trained, one being a model of type A, one being a model of type B and one being a model of type C. Each of the models is trained using the CAN messages of type X of the training set. Due to the fact that the CAN messages of the training set represent valid operation of the vehicle 202 on which the ADE is designed to operate, the models A, B and C are trained to identify anomalous behaviors of messages of type X.

It is to be noted that the different types of the models (e.g. models A, B and C) may be applied independently, simultaneously and/or in sequence at the operational stage of the ADE.

In some cases, the training of the models can be performed in an adaptive manner, so that the model is trained on a subset of the CAN messages of the respective CAN message type out of all the CAN messages of the respective CAN message type.

In such cases, the model is then tested by classifying another subset of the CAN messages of the respective CAN message type, being test data that is other than the data included in the subset of the CAN messages of the respective CAN message type used for training the model. The level of error achieved by the test classification is determined, and if it is below a certain threshold the model is regarded as being sufficiently trained so that there is no need in training it using additional CAN messages of the respective CAN message type. In some cases, additional data can be used during the training phase to monitor that the trained model is valid against the additional data. If the trained model is invalidated by the additional data, the additional data can be used to further train the model. As an alternative, an indirect test can be used, in which the consistency of the training set distribution is checked against additional test data other than the data included in the subset of the CAN messages of the respective CAN message type used for training the model.

It is to be noted that in some cases a conclusion may be reached that CAN messages of the respective CAN message type cannot be modeled by the models selected at block 430 (e.g. when CAN messages of the respective CAN message type show no underlying structures whatsoever). ADE generator module 140 generates the ADE, wherein the ADE is usable for classifying an unclassified CAN message of a given CAN message type as anomalous or non-anomalous based on results of execution of the models of the respective CAN message type on the unclassified CAN message (block 450). The generated ADE is configured to obtain an unclassified CAN message of a given CAN message type, execute those models that are trained to classify messages of the given CAN message type as anomalous or not, and determine, based on the results of the execution of such models, whether the unclassified CAN message is anomalous or not.

It is to be noted that, with reference to FIG. 4, some of the blocks can be integrated into a consolidated block or can be broken down to a few blocks and/or other blocks may be added. Furthermore, in some cases, the blocks can be performed in a different order than described herein. It is to be further noted that some of the blocks are optional. It should be also noted that whilst the flow diagram is described also with reference to the system elements that realizes them, this is by no means binding, and the blocks can be performed by elements other than those described herein.

Figure 5:
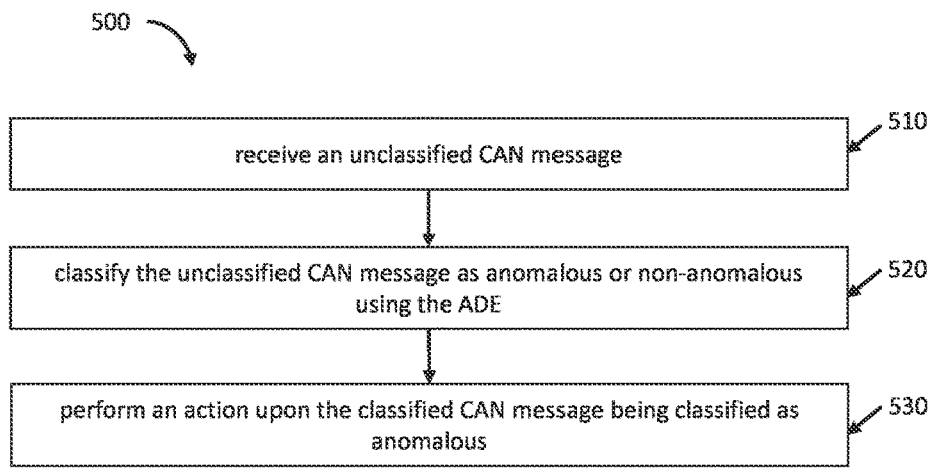
FIG. 5 is a flowchart illustrating one example of a sequence of operations carried out for identifying an abnormal event in an operational environment of a vehicle, in accordance with the presently disclosed subject matter.

Before turning to FIG. 5, it is to be noted that some existing solutions for detection of in-vehicle anomalies apply rule-based methods and/or systems to detect the abnormal event(s) by comparing transmission of intercepted messages to predefined rules and identifying incompliance with the rules. Such rule-based implementations may require identifying in advance most if not all possible valid, legitimate and/or normal operation modes or states of the vehicle. Such rule-based methods may further attempt to predict potential abnormal events that are derived from a given known set of threats and define the respective message transmission rules. The rule-based approach may naturally be very limited as it is impossible to predict all operation modes and states as well as abnormal events in advance, based on known threats. The ADE on the other hand may automatically and constantly evolve through training using the machine leaning algorithms to constantly learn normal vehicle operation scenarios. In addition, the ADE may be updated using large volumes of realistic training datasets thus significantly improving the accuracy and comprehensiveness of the ADE. Detecting the abnormal events using the ADE may therefore be significantly more comprehensive, accurate and/or effective compared to the rule-based implementations.

In addition, adaptation of the rule-based methods and/or systems to new operational modes/states and/or abnormal events may require extensive efforts and/or time to design new rules, to verify proper operation of the adjusted system, to re-deploy the adjusted system in the vehicles and/or the like. In contrast, the ADE, whether deployed in the vehicle or at an external server, can automatically evolve, optionally in real time, and may therefore significantly reduce such efforts and/or time for adjusting, verifying and/or deploying the system.

Still further, rule-based methods require knowledge of the semantic of the messages and their relationship with the vehicle's components and functionalities. Such information is very sensitive and vehicle manufacturers make vast efforts maintaining it confidential, as having such information may be used for performance of malicious activities on the vehicles. For example, each vehicle manufacturer designs a proprietary CAN matrix which defines the semantic and structure of various types of CAN bus messages that can flow through CAN buses of vehicles manufactured thereby. In some cases, a distinct CAN matrix is generated for each vehicle make and model, even though it is generated by the same vehicle manufacturer (and/or suppliers thereof). The ADE on the other hand may be generated without having any knowledge and/or understanding of the CAN matrix, e.g. as detailed herein.

Now turning to FIG. 5, there is shown a flowchart illustrating one example of a sequence of operations carried out for identifying an abnormal event in an operational environment of a vehicle, in accordance with the presently disclosed subject matter.

According to the presently disclosed subject matter, the message analyzer 220 can be configured to perform a message classification process 500. For this purpose, the message analyzer 220 is configured to receive an unclassified CAN message (block 510).

As described herein above, the message analyzer 220 may be locally executed by the analysis device 210 which is connected to one or more of the communication channels 302 as described for the system 300. In such case, the message analyzer 220 may receive the intercepted CAN messages from one or more monitors such as the monitor 320 adapted to monitor the communication channel(s) 302 including the CAN bus and intercept transmitted messages. In case the message analyzer 220 is remotely executed by the analysis server 230 (that, as indicated herein can be system 100), the message analyzer 220 may receive the intercepted CAN messages from the message collector 222 which may collect the intercepted messages from the monitor(s) 320 and forward them to the analysis server 230 via the network 240.

Message analyzer 220 classifies the unclassified. CAN message obtained at block 510 as anomalous or non-anomalous using the ADE generated by the anomaly detection engine generation process 400, giving rise to a classified CAN message (block 520). The ADE classifies the unclassified CAN message by executing those models that are trained to classify messages of the type of the unclassified CAN message as anomalous or not on the unclassified CAN message. Based on the results of the execution of the models, the ADE determines whether the unclassified CAN message is anomalous or not. In some cases, in order to determine that an unclassified CAN message is anomalous all of the models executed thereon are required to indicate that the unclassified CAN message is anomalous. In other cases, only some of the models executed thereon are required to indicate that the unclassified CAN message is anomalous. In more specific cases, it is enough that one model executed thereon indicates that the unclassified CAN message is anomalous in order to determine that the unclassified CAN message is anomalous. It is to be noted that these are mere examples, and other methods can be used to classify the unclassified CAN message as anomalous or not based on the results of the execution of the models thereon.

An anomalous message may be indicative of an abnormal event in which one or more potentially malicious devices transmitted the anomalous message. Additionally, and/or alternatively, such anomalous message(s) may be indicative of an abnormal event in which one or more legitimate devices and/or systems of the vehicle experience (exhibit) one or more malfunctions and/or failures.

In the event of detection of the abnormal event, i.e. the anomalous message, one or more actions may be performed by the message analyzer 220 (block 530).

For example, the action can include initiating an abnormal event alert and/or the like, informing one or more local and/or remote systems/users of the abnormal event and/or the like, optionally, further proactive operations may be taken in response to the abnormal event detection, for example, operate the vehicle 202 to prevent and/or circumvent potentially malicious and/or erroneous control message(s), apply security measures to identify and/or isolate the potentially malicious device(s), deploy emergency and/or maintenance procedures to encounter the malfunction(s) and/or failure(s) and/or the like.

In some cases, the alert can be provided to one or more of the following entities: a driver of a vehicle associated with the classified CAN message, a mechanic service provider (e.g. an automobile repair shop), a cyber analyst, a fleet manager, a car manufacturer, an Original Equipment Manufacturer (OEM), or the like.

In some cases, in addition to, or as an alternative of, providing an alert, the message analyzer 220 can be configured to perform a prevention measure for blocking or correcting the classified CAN message classified as anomalous, before it is transmitted on a CAN bus of a monitored vehicle. It is to be noted that for this purpose, the message analyzer 220 is required to perform the process 500 before the classified CAN message classified as anomalous is transmitted on a CAN bus of a monitored vehicle. This may be possible, for example, when the message analyzer 220 acts as a gateway to the CAN bus.

It is to be noted that, with reference to FIG. 5, some of the blocks can be integrated into a consolidated block or can be broken down to a few blocks and/or other blocks may be added. It is to be further noted that some of the blocks are optional. It should be also noted that whilst the flow diagram is described also with reference to the system elements that realizes them, this is by no means binding, and the blocks can be performed by elements other than those described herein.

Figure 6:
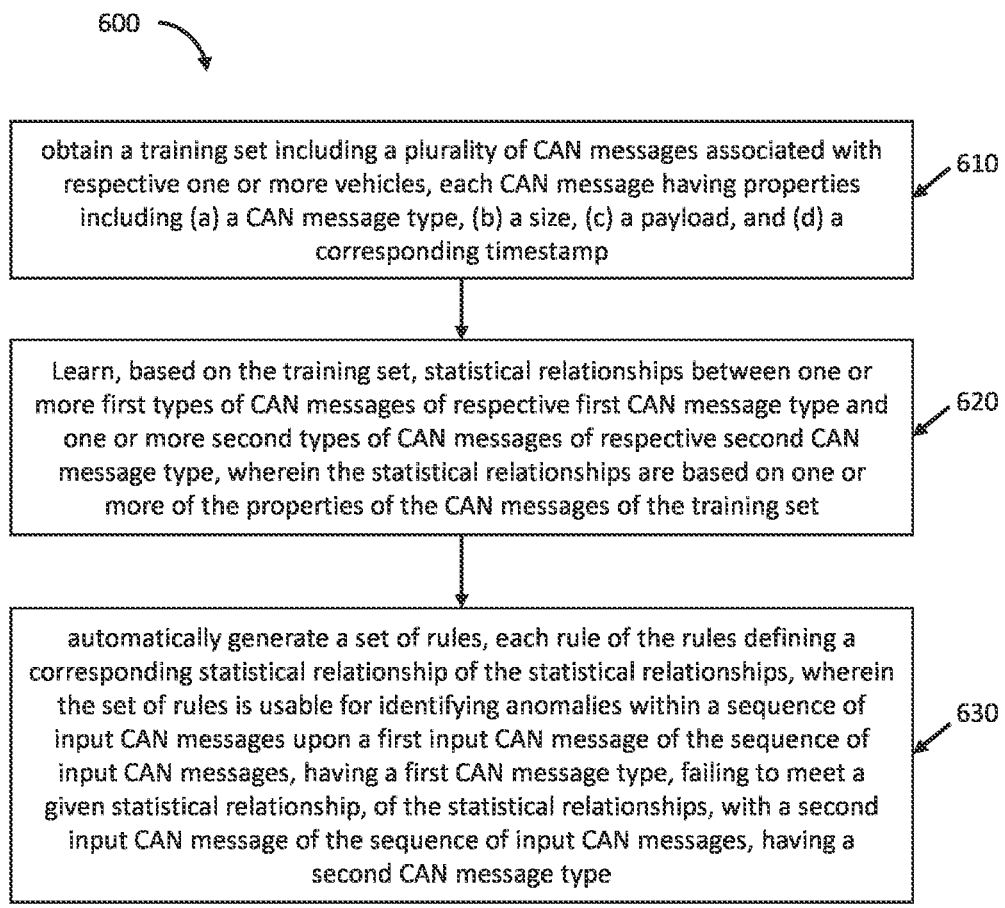
FIG. 6 is a flowchart illustrating one example of a sequence of operations carried out for generating a set of rules for detecting Controller Area Network (CAN) messages anomalies, in accordance with the presently disclosed subject matter.

FIG. 6 is a flowchart illustrating one example of a sequence of operations carried out for generating a set of rules for detecting Controller Area Network (CAN) messages anomalies, in accordance with the presently disclosed subject matter.

According to the presently disclosed subject matter, in addition to, or as an alternative for, performing the anomaly detection engine generation process 400, the anomaly detection rules generator module 160 can be configured to perform an anomaly detection rules generation process 600, during which it is configured to generate rules usable for identifying anomalies in a sequence of CAN messages intercepted during operation of a vehicle 202. Before turning to describe the anomaly detection rules generation process 600, it is to be noted that although reference is made herein to vehicles CAN messages, this is by no means limiting, and the teachings herein can be applied to other types of messages that are transmitted over any of the communications channel(s) 302 of the vehicle 202, and optionally also on other, non-vehicular environments, mutatis mutandis.

For the purpose of generating the rules, the anomaly detection rules generator module 160 obtains a training set including a plurality of CAN messages associated with respective one or more vehicles 202, each CAN message having properties including (a) a CAN message type (noting that in the CAN bus protocol the message type is also referred to as "arbitration ID"), (b) a size, (c) a payload, and (d) a corresponding timestamp (block 610).

The obtained training set can be the same training set obtained at block 410 and used for generating the ADE as detailed with respect to FIG. 4, or it can be a similar training set, having the same characteristics as detailed with respect to the training set obtained at block 410. It is to be noted that the amount of training set data required to complete the anomaly detection engine generation process 400 can be different than the amount of training set data required to complete the anomaly detection rules generation process 600.

Anomaly detection rules generator module 160 learns, based on the obtained training set, statistical relationships between one or more first types of CAN messages of respective first CAN message type and one or more second types of CAN messages of respective second CAN message type, wherein the statistical relationships are based on one or more of the properties of the CAN messages of the training set (block 620).

A statistical relationship can exist, for example, between CAN messages of type X and CAN messages of type Y, so that whenever a CAN message of type X exhibits a first behavior, one or more corresponding CAN messages of type Y exhibit a second predictable behavior. Another type of statistical relationship can exist, for example, between CAN messages of types X and Y and CAN messages of type Z, so that whenever a pair of CAN messages of types X and Y exhibit a first behavior, a CAN message of type Z exhibits a second predictable behavior. Still another type of statistical relationship can exist, for example, between CAN messages of type X and CAN messages of types Y and Z, so that whenever a CAN message of types X exhibit a first behavior, a pair of CAN message of types Y and Z exhibits a second predictable behavior. Yet another type of statistical relationship can exist, for example, between CAN messages of types X1 and Y1 and CAN messages of types X2 and Y2, so that whenever a pair of CAN messages of types X1 and Y1 exhibit a first behavior, a corresponding pair of CAN messages of types X2 and Y2 exhibits a second predictable behavior. It can be thus appreciated, in a more general manner, that the statistical relationship can be between CAN messages of a given CAN message type to CAN messages of the same given CAN message type, between CAN messages of one CAN message type to CAN messages of another CAN message type, between CAN messages of one CAN message type to CAN messages of many CAN message types, or between CAN messages of many CAN message types to CAN messages of many CAN message types.

The statistical relationships can be payload-based statistical relationships. A payload-based statistical relationship is based on the payloads of first messages of the first types and second messages of the second types. Such payload-based statistical relationship can be identified when at least a first part of the payload of each instance of the first messages within the training set is within a first payload-part range, given that a second part of the payload of each instance of the second messages within the training set following the respective instance of the first message in the sequence, is within a second payload-part range.

In some cases, each instance of the second messages is not only following the respective instance of the first message but it is the adjacent instance of the second messages that is adjacent to the respective instance of the first message. So, assuming for example that we have a sequence of messages of the following types appear in the following order: A1, B1, A2, C1, B2, A3, C2, D1, B3, and assuming that there is a statistical relationship between messages of type A and messages of type B that are adjacent to the messages of type B, the relationship is between A1 and B1, A2 and B2, A3 and B3.

In other cases, each instance of the second messages is not only following the respective instance of the first message, but it is the instance of the second messages that is within a lag difference from the respective instance of the first message. So, assuming for example that we have a sequence of messages of the following types appear in the following order: A1, B1, A2, C1, B2, A3, C2, D1, B3, and assuming that there is a statistical relationship between messages of type A and messages of type B that are within a lag of one with respect to the messages of type B, the relationship is between A1 and B2 and A2 and B3. It is to be noted that in the example the lag is one (so that the first message of type A and the second message of type A have a statistical relationship with the second message of type B and the third message of type B, respectively), the lag can be larger (e.g. the first message of type A and the second message of type A can have a statistical relationship with the third message of type B and the fourth message of type B, respectively, and so on).

Looking at a specific example, when a driver changes the throttle level, CAN message of type X with at least part of its payload being X' (indicating that the throttle level changed) can be transmitted on the vehicle's 202 CAN bus. Whenever the throttle level changed, the vehicle's 202 engine Rounds Per Minute (RPM) change and a respective CAN message of type Y with at least part of its payload being Y' is also transmitted on the vehicle's 202 CAN bus. The at least parts of the payloads X' and Y' of such CAN bus messages of types X and Y respectively, change in a mutually dependent manner. Therefore, a payload-based statistical relationship can be identified between CAN messages of type X with at least part of its payload being X' (that indicate that the throttle is changed), and CAN messages of type Y with at least part of its payload being Y' (that indicate that the RPM changed). The payload-based statistical relationship is identified due to the fact that analysis of the training set resulted in identification of the fact that whenever a CAN message of type X with at least part of its payload being X' (indicating that the throttle changed) is identified, a CAN message of type Y with at least part of its payload being Y' (indicating that the RPM changed) followed. Identification of a scenario in which a message of type X with at least part of its payload being X' is transmitted over a vehicle's 202 CAN bus, and a message of type Y at least part of its payload being Y' was not transmitted thereafter, or was transmitted with an anomalous value based on the mutual dependency, over the vehicle's 202 CAN bus—will be indicative of an anomaly.

Looking at another specific example, whenever a vehicle's 202 cruise control is turned on a CAN message of type X1 with at least part of its payload being X1' (indicating that the cruise control is turned on) is transmitted on the vehicle's 202 CAN bus. Whenever the driver pushes the brakes a CAN message of type Y1 with at least part of its payload being Y1' (indicating that the brakes are pushed) is transmitted on the vehicle's 202 CAN bus. When the brakes are pushed during operation of the cruise control, the cruise control is automatically turned off, and a CAN message of type Z1 with at least part of its payload being Z1' (indicating that the cruise control is turned off) is transmitted on the vehicle's 202 CAN bus. Therefore, a payload-based statistical relationship can be identified between CAN messages of type X1 and Y1 with respective payloads including X1' and Y1' (indicating that cruise control is turned on following which the brakes are pushed), and a CAN message of type Z1 with at least part of its payload being Z1' (indicating that the cruise control is turned off). The payload-based statistical relationship is identified due to the fact that analysis of the training set resulted in identification of the fact that whenever a CAN message of type X1 with at least part of its payload being X1' is followed by a CAN message of type Y1 with at least part of its payload being Y1' (indicating that the cruise control is turned on, following which the brakes are pushed), a CAN message of type Z1 with at least part of its payload being Z1' (indicating that the cruise control is turned off) followed. Identification of a scenario in which a CAN message of type X1 with at least part of its payload being X1' is followed by a CAN message of type Y1 with at least part of its payload being Y1', and a CAN message of type Z1 with at least part of its payload being Z1' did not follow—will be indicative of an anomaly.

Having described the payload-based statistical relationships, it is to be noted that in some cases, the element of time is also taken into account. In such cases, the statistical relationships can be time-and-payload-based statistical relationships, based on a combination of the corresponding timestamps and at least part of the payloads, of the first messages and the second messages. Adding the time factor to the statistical relationship determination can enable more accurate anomaly detection, as the payloads of CAN messages having a payload-based statistical relationship, may also depend on the time lapsing between transmittal of messages having the payload-based statistical relationship.

Looking at the example provided above, with respect to the windshield washer fluid and the wipers, it can be appreciated that due to the automatic mechanism that automatically triggers activation of the wipers, a CAN message of type Y with at least part of its payload being Y' (indicating that the vehicle's 202 windshield wipers are automatically activated as a result of the windshield washer fluid spray being activated) always follows a CAN message of type X with at least part of its payload being X' (indicating that the windshield washer fluid spray is activated) within less than ten milliseconds. Accordingly, the time-and-payload-based statistical relationships will be that whenever a CAN message of type X with at least part of its payload being X' (indicating that the windshield washer fluid spray is activated) is identified, a CAN message of type Y with at least part of its payload being Y' (indicating that the vehicle's 202 windshield wipers are automatically activated) follows within ten milliseconds. Identification of a scenario in which a CAN message of type X with at least part of its payload being X' is not followed, within ten milliseconds, by a CAN message of type Y with at least part of its payload being Y'—will be indicative of an anomaly.

Looking at the other example provided above, with respect to the vehicle's 202 cruise control and brakes, it can be appreciated that due to the automatic mechanism that automatically turns off the cruise control when it is operating and the brakes are pushed, CAN messages of type X1 with at least part of its payload being X1' (indicating that the cruise control is turned on) and Y1 with at least part of its payload being Y1' (indicating that the brakes are pushed) are always followed, within ten milliseconds, by a CAN message of type Z1 with at least part of its payload being Z1' (indicating that the cruise control is turned off). Accordingly, the time-and-payload-based statistical relationship will be that whenever CAN messages of type X1 with at least part of its payload being X1' and Y1 with at least part of its payload being Y1' (indicating that cruise control is turned on following which the brakes are pushed), a CAN message of type Z1 with at least part of its payload being Z1' (indicating that the cruise control is turned off) follows within ten milliseconds. Identification of a scenario in which a CAN message of type X1 with at least part of its payload being X1' is followed by a CAN message of type Y1 with at least part of its payload being Y1', and a CAN message of type Z1 with at least part of its payload being Z1' did not follow within ten milliseconds—will be indicative of an anomaly.

Anomaly detection rules generator module 160 is configured to automatically generate a set of rules, each rule of the rules defining a corresponding statistical relationship of the statistical relationships identified at block 620 (block 630). The generated set of rules is usable for identifying anomalies within a sequence of input CAN messages upon a first input CAN message of the sequence of input CAN messages, having a first CAN message type, failing to meet a given statistical relationship, of the statistical relationships, with a second input CAN message of the sequence of input CAN messages, having a second CAN message type.

Looking at the example provided above, with respect to the throttle level and the engine RPM, according to which a CAN message of type Y with at least part of its payload being Y' (indicating that the vehicle's 202 engine RPM changed) always follows a CAN message of type X with at least part of its payload being X' (indicating that the throttle level changed), a rule can define that whenever a CAN message of type X with at least part of its payload being X' (indicating that the throttle level changed) is identified, a CAN message of type Y with at least part of its payload being Y' (indicating that the vehicle's 202 engine RPM changed) must follow, otherwise the rule is not met.

Looking at the other example provided above, with respect to the vehicle's 202 cruise control and brakes, according to which CAN messages of type X1 with at least part of its payload being X1' (indicating that the cruise control is turned on) and Y1 with at least part of its payload being Y1' (indicating that the brakes are pushed) are always followed, within ten milliseconds, by a CAN message of type Z1 with at least part of its payload being Z1' (indicating that the cruise control is turned off), a rule can define that whenever a CAN message of type X1 with at least part of its payload being X1' (indicating that the cruise control is turned on) is followed by a CAN message of type Y1 with at least part of its payload being Y1' (indicating that the brakes are pushed), a CAN message of type Z1 with at least part of its payload being Z1' (indicating that the cruise control is turned off) must follow within ten milliseconds, otherwise the rule is not met.

It is to be noted that, with reference to FIG. 6, some of the blocks can be integrated into a consolidated block or can be broken down to a few blocks and/or other blocks may be added. It is to be further noted that some of the blocks are optional. It should be also noted that whilst the flow diagram is described also with reference to the system elements that realizes them, this is by no means binding, and the blocks can be performed by elements other than those described herein.

Figure 7:
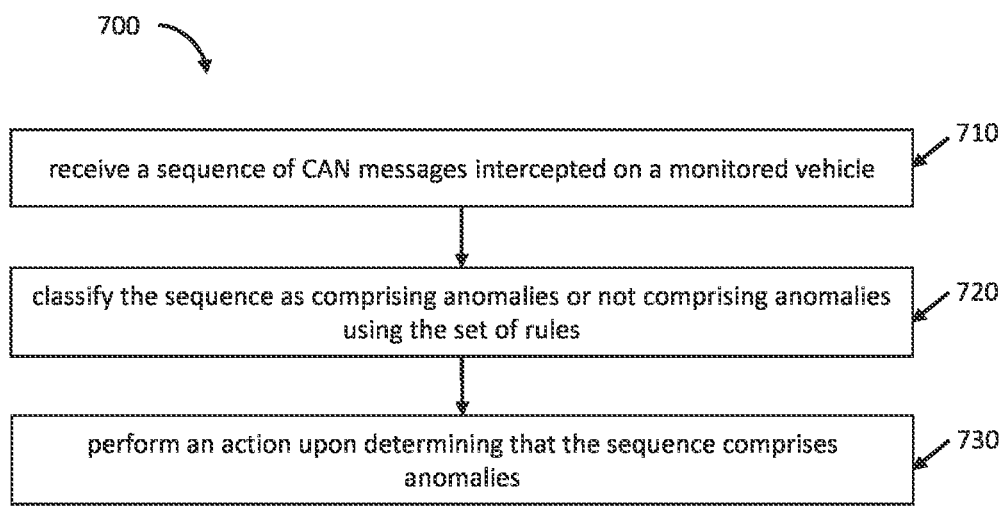
FIG. 7 is a flowchart illustrating one example of a sequence of operations carried out for identifying anomalies using set of rules for detecting Controller Area Network (CAN) messages anomalies in an operational environment of a vehicle, in accordance with the presently disclosed subject matter.

Turning to FIG. 7, is a flowchart illustrating one example of a sequence of operations carried out for identifying anomalies using set of rules for detecting Controller Area Network (CAN) messages anomalies in an operational environment of a vehicle, in accordance with the presently disclosed subject matter.

According to the presently disclosed subject matter, in addition to, or as an alternative for, performing the message classification process 500, the message analyzer 220 can be configured to perform a message sequence classification process 700. For this purpose, the message analyzer 220 is configured to receive a sequence of CAN messages intercepted on a monitored vehicle 202 (block 710).

As described herein above, the message analyzer 220 may be locally executed by the analysis device 210 which is connected to one or more of the communication channels 302 as described for the system 300. In such case, the message analyzer 220 may receive the intercepted CAN messages sequence from one or more monitors such as the monitor 320 adapted to monitor the communication channel(s) 302 including the CAN bus and intercept transmitted messages. In case the message analyzer 220 is remotely executed by the analysis server 230 (that, as indicated herein can be the system 100), the message analyzer 220 may receive the intercepted CAN messages sequence from the message collector 222 which may collect the intercepted messages from the monitor(s) 320 and forward them to the analysis server 230 via the network 240.

Message analyzer 220 classifies the sequence obtained at block 710 as comprising anomalies or not comprising anomalies using the set of rules of claim generated by the anomaly detection rules generation process 600 (block 720).

For this purpose, the message analyzer 220 checks if any of the rules is not met by the sequence of CAN messages, and any unmet rule results in an indication of an anomaly. In some cases, the sequence is classified as comprising anomalies if one or more rules are not met. In other cases, in order for the sequence to be classified as comprising anomalies, above a threshold number of rules (two or more) are required not to be met. In yet other cases, the message analyzer counts the number of rules that are not met and provides the number as part of the actions of block 730 detailed herein, so that the action can be optionally determined according to the number of rules that are not met by the sequence of CAN messages obtained at block 710.

Identification of anomalies within the sequence of CAN messages obtained at block 710 may be indicative of one or more abnormal events in which one or more potentially malicious devices transmitted one or more anomalous messages, or did not transmit a message that should have been transmitted in valid operation of the monitored vehicle 202. Additionally, and/or alternatively, such anomalies in the sequence of CAN messages obtained at block 710 may be indicative of an abnormal event in which one or more legitimate devices and/or systems of the vehicle 202 experience (exhibit) one or more malfunctions and/or failures.

In the event of detection of the anomalies in the sequence of CAN messages obtained at block 710, one or more actions may be performed by the message analyzer 220 (block 730).

For example, the action can include initiating an abnormal event/s alert (indicative of anomalies in the sequence of CAN messages) and/or the like, informing one or more local and/or remote systems/users of the abnormal event/s and/or the like, optionally, further proactive operations may be taken in response to the abnormal event/s detection, for example, operate the vehicle 202 to prevent, circumvent and/or bypass potentially malicious and/or erroneous CAN message(s), apply security measures to identify and/or isolate the potentially malicious device(s), deploy emergency and/or maintenance procedures to encounter the malfunction(s) and/or failure(s) and/or the like.

In some cases, the alert can be provided to a driver of a vehicle 202 associated with the sequence of CAN messages, a mechanic service provider (e.g. an automobile repair shop), a cyber analyst, a fleet manager, or the like. The alert can optionally comprise information of the detected anomalies, and optionally a count of detected anomalies within the sequence of CAN messages.

In some cases, in addition to, or as an alternative of, providing an alert, the message analyzer 220 can be configured to perform a prevention measure for blocking or correcting CAN messages that are associated with the detected anomaly/anomalies, before they are transmitted on the CAN bus of the monitored vehicle 202. It is to be noted that for this purpose, the message analyzer 220 is required to perform the process 700 before the sequence of messages is transmitted on a CAN bus of a monitored vehicle 202. This may be possible, for example, when the message analyzer 220 acts as a gateway to the CAN bus.

In some cases, the entity to which the alert is sent is a central system that is configured to receive alerts from a plurality of vehicles. In such cases, the central system can be configured to provide a user thereof with one or more insights determined based on the anomalies detected within the sequence of CAN messages intercepted on the monitored vehicle 202, and based on additional anomalies detected within respective additional sequences of additional CAN messages intercepted on respective additional monitored vehicles, optionally within a given time-period and/or geographical location.

Having such a central system can enable detecting external events that have an effect on the monitored vehicles or on a behavior of the drivers of such vehicles. Such external events can be, for example, ice on road (or other weather conditions that affect behavior of the vehicles 202 or drivers thereof), an ongoing cyber-attack that affects a plurality of vehicles, a specific vehicle model failure, etc. The events may be detected based on correlations between anomalies detected on sequences of CAN messages obtained from a plurality of vehicles, optionally noting the time element and the geographical location.

It is to be noted that, with reference to FIG. 7, some of the blocks can be integrated into a consolidated block or can be broken down to a few blocks and/or other blocks may be added. It is to be further noted that some of the blocks are optional. It should be also noted that whilst the flow diagram is described also with reference to the system elements that realizes them, this is by no means binding, and the blocks can be performed by elements other than those described herein.

Figure 8:
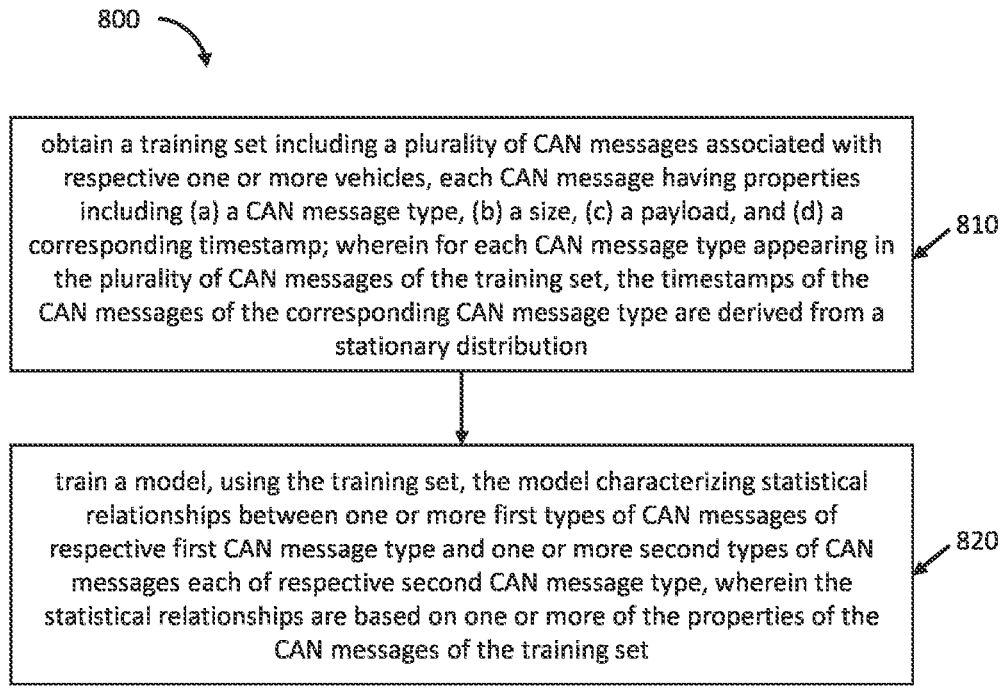
FIG. 8 is a flowchart illustrating one example of a sequence of operations carried out for generating a model for detecting anomalies within sequences of Controller Area Network (CAN) messages, in accordance with the presently disclosed subject matter.

Turning to FIG. 8, there is shown a flowchart illustrating one example of a sequence of operations carried out for generating a model for detecting anomalies within sequences of Controller Area Network (CAN) messages, in accordance with the presently disclosed subject matter.

According to the presently disclosed subject matter, in addition to, or as an alternative for, performing the anomaly detection engine generation process 400 and/or to performing the anomaly detection rules generation process 600, the anomaly detection model generator module 170 can be configured to perform a model generation process 800, during which it is configured to generate a model usable for identifying anomalies in a sequence of CAN messages intercepted during operation of a vehicle 202. Before turning to describe the model generation process 800, it is to be noted that although reference is made herein to vehicles CAN messages, this is by no means limiting, and the teachings herein can be applied to other types of messages that are transmitted over any of the communications channel(s) 302 of the vehicle 202, and optionally also on other, non-vehicular environments, mutates mutandis. In addition, although reference is made herein to CAN messages in their entirety, in some cases only certain parts of CAN messages can be used instead of full CAN messages (e.g. internal variables of the CAN messages, arbitrary portions of the CAN messages, etc.), mutatis mutandis.

For the purpose of generating the model, the anomaly detection model generator module 170 obtains a training set including a plurality of CAN messages associated with respective one or more vehicles 202, each CAN message having properties including (a) a CAN message type (noting that in the CAN bus protocol the message type is also referred to as "arbitration ID" or a "CAN MID"), (b) a size, (c) a payload, and (d) a corresponding timestamp, while noting that for each CAN message type appearing in the plurality of CAN messages of the training set, the timestamps of the CAN messages of the corresponding CAN message type are derived from a stationary distribution (i.e. the CAN messages of the respective CAN message types have a synchronicity attribute) (block 810).

The obtained training set can optionally be a subset of the training set obtained at block 410 and used for generating the ADE as detailed with respect to FIG. 4, or it can be a similar training set, having the same characteristics as detailed with respect to the training set obtained at block 410, which comprises CAN message of CAN message types that are synchronous, and/or a synchronous parts of CAN message of CAN message types that are hybrid. It is to be noted that the amount of training set data required to complete the model generation process 800 can be different than the amount of training set data required to complete the anomaly detection engine generation process 400 or the anomaly detection rules generation process 600.

Anomaly detection model generator module 170 trains a model, using the training set obtained at block 810 (while noting that the training set obtained at block 810 can be a subset of the training set which includes only (a) CAN messages that are of a CAN message type that has a synchronicity attribute, and (b) a synchronous subset of CAN messages that are of a CAN message type that has a hybridity attribute), the model characterizing statistical relationships between one or more first types of CAN messages of respective first CAN message type and one or more second types of CAN messages of respective second CAN message type, wherein the statistical relationships are based on one or more of the properties of the CAN messages of the training set (block 820).

The model is trained to characterize the statistical relationships between changes in the payloads of the one or more first types of CAN messages and changes in the payloads of the one or more second types of CAN messages, as further detailed herein. In addition, the model is further trained to estimate expected payloads of the one or more second types of CAN messages given a sequence of payloads of instances of CAN messages of the one or more first types of CAN messages, as further detailed herein.

Before explaining the training process, it is to be noted, for exemplary purposes, that a statistical relationship can exist, for example, between CAN messages of type X and CAN messages of type Y, so that whenever a CAN message of type X exhibits a first behavior, one or more corresponding CAN messages of type Y exhibit a second predictable behavior. Another type of statistical relationship can exist, for example, between CAN messages of types X and Y and CAN messages of type Z, so that whenever a pair of CAN messages of types X and Y exhibit a first behavior, a CAN message of type Z exhibits a second predictable behavior. Still another type of statistical relationship can exist, for example, between CAN messages of type X and CAN messages of types Y and Z, so that whenever a CAN message of types X exhibit a first behavior, a pair of CAN message of types Y and Z exhibits a second predictable behavior. Yet another type of statistical relationship can exist, for example, between CAN messages of types X1 and Y1 and CAN messages of types X2 and Y2, so that whenever a pair of CAN messages of types X1 and Y1 exhibit a first behavior, a corresponding pair of CAN messages of types X2 and Y2 exhibits a second predictable behavior. It can be thus appreciated, in a more general manner, that the statistical relationship can be between CAN messages of a given CAN message type to CAN messages of the same given CAN message type, between CAN messages of one CAN message type to CAN messages of another CAN message type, between CAN messages of one CAN message type to CAN messages of many CAN message types, or between CAN messages of many CAN message types to CAN messages of many CAN message types.

Looking at a specific example, when a driver changes the throttle level, CAN message of type X with at least part of its payload being X' (indicating that the throttle level changed) can be transmitted on the vehicle's 202 CAN bus. Whenever the throttle level changed, the vehicle's 202 engine Rounds Per Minute (RPM) change and a respective CAN message of type Y with at least part of its payload being Y' is also transmitted on the vehicle's 202 CAN bus. The at least parts of the payloads X' and Y' of such CAN bus messages of types X and Y respectively, change in a mutually dependent manner. Therefore, a payload-based statistical relationship can be identified between CAN messages of type X with at least part of its payload being X' (that indicate that the throttle is changed), and CAN messages of type Y with at least part of its payload being Y' (that indicate that the RPM changed). The payload-based statistical relationship is identified due to the fact that analysis of the training set resulted in identification of the fact that whenever a CAN message of type X with at least part of its payload being X' (indicating that the throttle changed) is identified, a CAN message of type Y with at least part of its payload being Y' (indicating that the RPM changed) followed. Identification of a scenario in which a message of type X with at least part of its payload being X' is transmitted over a vehicle's 202 CAN bus, and a message of type Y at least part of its payload being Y' was not transmitted thereafter, or was transmitted with an anomalous value based on the mutual dependency, over the vehicle's 202 CAN bus—will be indicative of an anomaly.

In some cases, in order to identify the statistical relationships, an assumption is made that the dependency between the CAN messages of the different CAN message types is stationarity, in the sense that the statistical relationships are not expected to vanish or be abrupt, if not due to an anomalous behavior (e.g. since we consider vehicles which in at least part of its operation have constant behavioral relationship between CAN messages of different CAN message types). Based on this assumption classification modeling is utilized (e.g. coarse descriptive statistics) for identifying statistical relationships between CAN messages of different CAN message types. This can be followed by feature selection (dimensions reduction) to generate a final list of relationships between CAN messages of different CAN message types. For better understanding, assuming that all CAN message types of the training set are represented by a graph, the process described above identifies cliques within the graph, where a node is a CAN message type, and an edge represents a dependency between messages of the respective CAN message types (for example, a change in a payload of a message of a given CAN message type follows a respective change in a payload of CAN messages of at least part of the CAN message types that are connected to a node representing the given CAN message type via respective edges in the graph). On top of that, in some cases, bit-wise interactions between the payloads of the CAN messages of each clique of the graph can be learned using an encoder-decoder (or more specifically auto-encoders) architecture for anomaly detection, as further detailed herein.

The model can be trained as follows: a plurality of CAN message type classification models are trained, one per CAN message type (referred to herein as: target CAN message type): the sequence of payloads of CAN messages of the target CAN message type in the training set are encoded as binary "labels" of the classification problem, by the following principle: if the payload changed with respect to a previously observed payload of the target CAN message type we assign a first value (e.g. the value one (1)), whereas in case of no change we assign a second value (e.g. the value zero (0)). In this way we obtain a vector of "binary labels" for the classification problem. A features matrix is composed in a similar way to the labels-vector for all CAN message types excluding the target CAN message type, while noting that:

1. Whenever an occurrence of a message of a certain CAN message type is "missing" between the current occurrence of the target CAN message type and the previous current occurrence of the target CAN message type, we use an appropriate "missing" indicator (e.g. null or NAN (Not A Number));

2. In cases where a message of a certain CAN message type appears multiple times between the current occurrence of the target CAN message type and the previous current occurrence of the target CAN message type, we include a respective amount of binary values by the same principle in the matrix (if the payload changed with respect to a previously observed payload of the corresponding CAN message type we assign a change indicative value (e.g. the value one (1)), whereas in case of no change we assign a no-change indicative value (e.g. the value zero (0))).

The above process results in the features matrix having binary values and "missing" indicators where appropriate, along with a binary labels vector of the CAN messages of the target CAN message type.

Anomaly detection model generator module 170 can be further configured to train a classifier using the features matrix along with the binary labels vector of the target CAN message type. For supporting the structure of "missing" indicators and due to other statistical advantages, an XGBoost classifier can be used for modeling the relation between the features matrix and the binary labels vector of the CAN messages of the target CAN message type.

The classification modeling is finalized with a feature selection process (e.g. a Boruta based feature selection process) in order to include only the statistically significant features from amongst all of the candidate features of the features matrix. The statistically significant features represent CAN message types that affect the target CAN message type, being referred to herein as "affecting CAN message types".

In other words, the model comprises a plurality of CAN message type classification models for a plurality of respective CAN message types that appear in the training set. Each of the CAN message type classification models is trained by performing the following for the respective CAN message type, being a target CAN message type:

(a) Creating a training matrix where each row represents a given target instance of a plurality of target instances of CAN messages of the target CAN message type of the training set. Each row comprises: (i) a target cell representing presence of a change between the payload of the given target instance and the payload of a preceding target instance preceding the given target instance in the target instances, if any exist (it is to be noted that the target cell represents a cell in the label vector, associated with the target CAN message type); and (ii) source cells, each of the source cells being associated with a respective CAN message type of the CAN message types excluding the target CAN message type. Upon a source instance of a plurality of source instances of CAN messages of the corresponding CAN message type being present between the target instance and the preceding target instance of the training set, the respective source cell represents presence of a second change between the payload of the given source instance and the payload of a preceding source instance preceding the given source instance in the source instances, if any exist. Upon the source instance of a plurality of source instances of CAN messages of the corresponding CAN message type not being present between the target instance and the preceding target instance of the training set, the respective source cell represents a non-presence. It is to be noted that the source cells in each column of the matrix represents a corresponding CAN message type;

(b) Training, by a machine learning algorithm (such as XGBoost), the respective CAN message type classification model using the training matrix and the binary labels vector of the target CAN message type.

In some cases, the training matrix is created so that upon presence of more than one source instance of the plurality of source instances of CAN messages of the corresponding CAN message type being present between the target instance and the preceding target instance of the training set, a plurality of additional source cells are introduced into the row, each representing a respective instance of the plurality of source instances. It is to be noted that in such cases, the number of additional source cells introduces into the row can be limited by a threshold.

In some case, for at least part of the CAN message type classification models, the training further includes selecting statistically significant columns of the columns of the matrix, and in such cases, the statistically significant columns are representative of the statistical relationships.

As indicated herein, in some cases, bit-wise interactions, between the payloads of CAN messages of the affecting CAN message types (being the CAN message types represented by the statistically significant columns, also referred to herein as "source CAN message types") and the payloads of CAN messages of the target CAN message type, can be learned using an encoder-decoder/autoencoder system for anomaly detection.

In more specific cases, bit-wise dependencies between payloads of the CAN messages of each clique of the graph can be learned using autoencoders. This may require to model sequences of target CAN message types and the corresponding source CAN message types while joining to each CAN message types (target or sources) not only the payload value but also its pertinent MID value.

Encoder-decoder based modeling is in wide usage in the community of machine learning, where it is used mostly in problems of sequence-to-sequence modeling (e.g. language translation, caption generation for images). Both the encoder and the decoder often comprise an RNN system where most simply, the summarized hidden state of the encoder is served as the initial state for the RNN decoder. Given the input and output sequences, the encoder-decoder will learn meaningful features that model the transitions between the input and output sequences. This encoder-decoder based modeling enables revealing features that reflect bit-level interactions between the affecting CAN message types and the corresponding target CAN message type, Often, for anomaly detection, the encoder-decoder based modeling will be reduced to on an autoencoder architecture.

Accordingly, when using encoder-decoder based modeling the training of the model further includes training an encoder-decoder, with a first sequence of payloads of the target instances as output, and a second sequence of respective payloads of instances of CAN messages of the training set represented by the statistically significant columns and preceding the respective target instances as input.

In more specific cases, when using autoencoder based modeling, valid sequences composed on the CAN messages of the target CAN message type and the source CAN message types can be modeled. These sequences can represent payload value concatenated to a binary encoded pertinent MID value. The training of the autoencoder will provide and reflect the existing constraints between the inter-dependent CAN messages of each clique of the graph. By controlling the sequence length different time scales of interactions can optionally be controlled.

Having a trained encoder-decoder/autoencoder can enable classifying a given sequence of CAN messages that are identified as having a statistical relationship as anomalous or not.

Looking at an example, let's assume that a statistical relationship is identified between CAN messages of types X and Y and CAN messages of type Z, so that whenever payloads of CAN messages of types X and Y change with respect to the payloads of a preceding occurrence thereof, the payload of a CAN message of type Z changes with respect to the payload of a preceding occurrence thereof. When an encoder-decoder/autoencoder is trained, it can be trained to identify the bit-wise relationships between specific bits of the payloads of the CAN messages of types X and Y, and CAN messages of type Z. So, when a sequence of CAN messages including CAN messages of types X, Y and Z is provided for evaluation, the encoder-decoder checks each occurrence of CAN messages of type Z and validates it with reference to the respective occurrences of the CAN messages of types X and Y, based on the training thereof, to determine if any anomaly is identified (while checking the distance between actual payload values of CAN messages of type Z versus the expected payload values of such CAN messages of type Z given the payload values of the CAN messages of types X and Y that preceded the respective CAN message of type Z).

Alternatively, when using an autoencoder, the autoencoder will reconstruct the introduced sequences of messages X, Y, and Z, and based on a reconstruction error, will determine if the sequence is anomalous or not. Accordingly, sequences of a given number of CAN messages of the source CAN message types and the target CAN message type are used for the training, and the autoencoder learns the inter-dependency between the various members of each of the sequences. So, when a given sequence of the given number of CAN messages is obtained, it can be classified as anomalous or not based on a reconstruction error (being a distance between the reconstructed sequence and the actual given sequence.

It is to be noted that, with reference to FIG. 8, some of the blocks can be integrated into a consolidated block or can be broken down to a few blocks and/or other blocks may be added. It is to be further noted that some of the blocks are optional. It should be also noted that whilst the flow diagram is described also with reference to the system elements that realizes them, this is by no means binding, and the blocks can be performed by elements other than those described herein.

Figure 9:
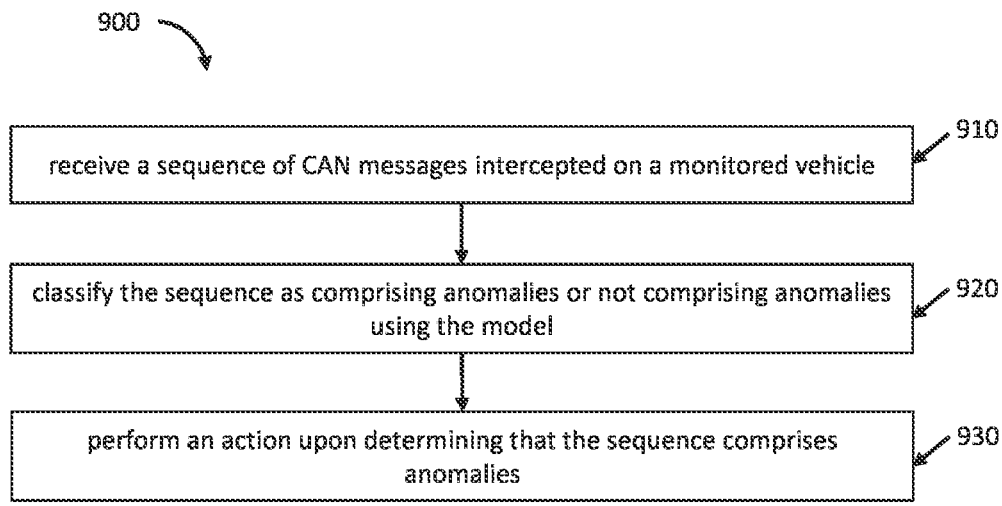
FIG. 9 is a flowchart illustrating one example of a sequence of operations carried out for identifying anomalies using a model for detecting anomalies within sequences of Controller Area Network (CAN) messages, in accordance with the presently disclosed subject matter.

Turning to FIG. 9, is a flowchart illustrating one example of a sequence of operations carried out for identifying anomalies using a model for detecting anomalies within sequences of Controller Area Network (CAN) messages, in accordance with the presently disclosed subject matter.

According to the presently disclosed subject matter, in addition to, or as an alternative for, performing the message classification process 500 and/or the message sequence classification process 700, the message analyzer 220 can be configured to perform a second message sequence classification process 900. For this purpose, the message analyzer 220 is configured to receive a sequence of CAN messages intercepted on a monitored vehicle 202 (block 910).

As described herein above, the message analyzer 220 may be locally executed by the analysis device 210 which is connected to one or more of the communication channels 302 as described for the system 300. In such case, the message analyzer 220 may receive the intercepted CAN messages sequence from one or more monitors such as the monitor 320 adapted to monitor the communication channel(s) 302 including the CAN bus and intercept transmitted messages. In case the message analyzer 220 is remotely executed by the analysis server 230 (that, as indicated herein, can be the system 100), the message analyzer 220 may receive the intercepted CAN messages sequence from the message collector 222 which may collect the intercepted messages from the monitor(s) 320 and forward them to the analysis server 230 via the network 240.

Message analyzer 220 classifies the sequence obtained at block 910 as comprising anomalies or not comprising anomalies using the model generated by the model generation process 800 (block 920). For this purpose, the message analyzer 220 checks if any anomaly exists within the sequence of CAN messages using the model that classifies each message as anomalous or not based on its statistical relationships with CAN messages of other types. In some cases, the sequence is classified as comprising anomalies if any anomaly is identified. In other cases, in order for the sequence to be classified as comprising anomalies, above a threshold number of anomalies (two or more) are required not to be identified. In yet other cases, the message analyzer counts the number of identified anomalies within the sequence of CAN messages obtained at block 910 and provides the number as part of the actions of block 930 detailed herein, so that the action can be optionally determined according to the number of identified anomalies in the sequence of CAN messages obtained at block 910.

Identification of anomalies within the sequence of CAN messages obtained at block 910 may be indicative of one or more abnormal events in which one or more potentially malicious devices transmitted one or more anomalous messages, or did not transmit a message that should have been transmitted in valid operation of the monitored vehicle 202. Additionally, and/or alternatively, such anomalies in the sequence of CAN messages obtained at block 910 may be indicative of an abnormal event in which one or more legitimate devices and/or systems of the vehicle 202 experience (exhibit) one or more malfunctions and/or failures.

In the event of detection of the anomalies in the sequence of CAN messages obtained at block 910, one or more actions may be performed by the message analyzer 220 (block 930).

For example, the action can include initiating an abnormal event's alert (indicative of anomalies in the sequence of CAN messages) and/or the like, informing one or more local and/or remote systems/users of the abnormal event/s and/or the like optionally, further proactive operations may be taken in response to the abnormal event/s detection, for example, operate the vehicle 202 to prevent, circumvent and/or bypass potentially malicious and/or erroneous CAN message(s), apply security measures to identify and/or isolate the potentially malicious device(s), deploy emergency and/or maintenance procedures to encounter the malfunction(s) and/or failure(s) and/or the like.

In some cases, the alert can be provided to a driver of a vehicle 202 associated with the sequence of CAN messages, a mechanic service provider (e.g. an automobile repair shop), a cyber analyst, a fleet manager, or the like. The alert can optionally comprise information of the detected anomalies, and optionally a count of detected anomalies within the sequence of CAN messages.

In some cases, in addition to, or as an alternative of, providing an alert, the message analyzer 220 can be configured to perform a prevention measure for blocking or correcting CAN messages that are associated with the detected anomaly/anomalies, before they are transmitted on the CAN bus of the monitored vehicle 202. It is to be noted that for this purpose, the message analyzer 220 is required to perform the process 700 before the sequence of messages is transmitted on a CAN bus of a monitored vehicle 202. This may be possible, for example, when the message analyzer 220 acts as a gateway to the CAN bus.

In some cases, the entity to which the alert is sent is a central system that is configured to receive alerts from a plurality of vehicles. In such cases, the central system can be configured to provide a user thereof with one or more insights determined based on the anomalies detected within the sequence of CAN messages intercepted on the monitored vehicle 202, and based on additional anomalies detected within respective additional sequences of additional CAN messages intercepted on respective additional monitored vehicles, optionally within a given time-period and/or geographical location.

Having such a central system can enable detecting external events that have an effect on the monitored vehicles or on a behavior of the drivers of such vehicles. Such external events can be, for example, ice on road (or other weather conditions that affect behavior of the vehicles 202 or drivers thereof), an ongoing cyber-attack that affects a plurality of vehicles, a specific vehicle model failure, etc. The events may be detected based on correlations between anomalies detected on sequences of CAN messages obtained from a plurality of vehicles, optionally noting the time element and the geographical location.

It is to be noted that, with reference to FIG. 9, some of the blocks can be integrated into a consolidated block or can be broken down to a few blocks and/or other blocks may be added. It is to be further noted that some of the blocks are optional. It should be also noted that whilst the flow diagram is described also with reference to the system elements that realizes them, this is by no means binding, and the blocks can be performed by elements other than those described herein.

Turning to FIG. 10, is a flowchart illustrating one example of a sequence of operations carried out for labeling bit positions of Controller Area Network (CAN) message types, in accordance with the presently disclosed subject matter.

According to the presently disclosed subject matter, the labeling module 180 can be configured to perform a labeling process 1000, during which it is configured to a sequence of CAN messages intercepted during operation of a vehicle 202. Before turning to describe the labeling process 1000, it is to be noted that although reference is made herein to vehicles CAN messages, this is by no means limiting, and the teachings herein can be applied to other types of messages that are transmitted over any of the communications channel(s) 302 of the vehicle 202, and optionally also on other, non-vehicular environments, mutatis mutandis. In addition, although reference is made herein to CAN messages in their entirety, in some cases only certain parts of CAN messages can be used instead of full CAN messages (e.g. internal variables of the CAN messages, arbitrary portions of the CAN messages, etc.), mutatis mutandis.

For the purpose of labeling bit positions of CAN message types as affected bits or unaffected bits, the anomaly labeling module 180 obtains a training set including a plurality of CAN messages associated with respective one or more vehicles 202, each CAN message having properties including (a) a CAN message type (noting that in the CAN bus protocol the message type is also referred to as "arbitration ID" or a "CAN MID"), (b) a size, (c) a payload, and (d) a corresponding timestamp, while noting that for each CAN message type appearing in the plurality of CAN messages of the training set, the timestamps of the CAN messages of the corresponding CAN message type are derived from a stationary distribution (i.e. the CAN messages of the respective CAN message types have a synchronicity attribute) (block 1010).

Block 1010 is similar to block 810 as further described herein, inter alia with reference to FIG. 8.

For each given CAN message type of a plurality of synchronous CAN message types, labeling module 180 trains a model, using the training set obtained at block 1010 (while noting that the training set obtained at block 1010 can be a subset of the training set which includes only (a) CAN messages that are of a CAN message type that has a synchronicity attribute, and (b) a synchronous subset of CAN messages that are of a CAN message type that has a hybridity attribute), the model characterizing statistical relationships between changes in first payloads of first CAN messages of one or more other CAN message types, other than the given CAN message type, and changes in second payloads of second CAN messages of the given CAN message type, wherein the first CAN messages and the second CAN messages are part of the training set (block 1020).

Block 1020 is similar to block 820 as further described herein, inter alia with reference to FIG. 8.

It is to be noted that the model can characterize statistical relationships other than changes of the payloads, for example: appearance of messages, directed changes (increase/decrease) or specific values that will be out of scope of the statistical relationship.

It is to be noted that the models trained by the labeling module 180 for each given CAN message type of the plurality of synchronous CAN message types, can have a model score. The model score is representative of how well the set of the one or more other CAN message types models the changes we are modeling for the given CAN message type. The model score can be specified by using a Receiver Operating Characteristic (ROC)-Area Under Curve (AUC) metric, wherein when ROC-AUC→1, the modeling is validated and the prediction is perfect, thus the model can predict changes in the given CAN message type by using the set of the one or more other CAN message types and labeling module 180 is can label all bit positions of the given CAN message type as affected bits, and wherein whenever ROC-AUC→0.5, the modeling is invalidated and the prediction is flawed, thus the model and using the model is no better than flipping a fair-coin to guess changes in the corresponding given CAN message type. In this case, the model can not predict changes in the given CAN message type by using the set of the one or more other CAN message types and labeling module 180 is can label all bit positions of the given CAN message type as unaffected bits. For a model score that is between 0.5 and 1, the labeling module 180 can label the points where the model is incorrect at the level of bit positions of the payload of the given CAN message type, as further explained below.

After training the models, labeling module 180, can be further configured to label, for the given CAN message type, each bit position in a sequence of bits comprising the second payloads, as one of the unaffected bit, upon the values of the bits positioned at the respective bit positions within the second payloads not changing in dependency to changes of the first payloads, or as one of the affected bit upon the values of the bits positioned at the respective bit positions within the second payloads changing in dependency to changes of the first payloads (block 1030).

The labeling module 180 can label the bits positions of the given CAN message type as affected of unaffected by performing the following:

(a) creating a training matrix wherein each row of the training matrix represents a given instance of a plurality of instances of CAN messages of the given CAN message type of the training set whose payload changes with respect to a previous instance of the plurality of instances, and each row comprises: a target cell representing adherence of the given instance to the statistical relationships characterized by the model; and source cells comprising the bits of the payloads of the given instance located at respective bit positions associated with the source cells;

(b) training the one or more machine learning models using the training matrix to identify a most influencing bit, being the bit positioned at the hit position associated with the source cell that has the highest influence on the value of the target cell;

(c) calculating an accuracy score for the machine learning model;

(d) removing a column of the training matrix associated with the most influencing bit;

(e) labeling the bit position associated with the most influencing bit as one of the unaffected bits;

(f) repeating (b) to (e) until all columns are removed from the training matrix, or until the accuracy score being below a threshold; and (g) labeling the bit positions associated with the remaining columns remaining in the training matrix, if any, as affected bits.

Looking at a specific example, CAN message of type X can be associated with the steering wheel, with at least part of its payload (for example, bit positions 63 and 64) being representative of the angle of the steering wheel (dependent on behavior of a driver of the vehicle 202) can be transmitted on the vehicle's 202 CAN bus and may be part of the training set obtained in block 1010. Changes in the payload of CAN messages of type X are found by the model generated in block 1020 to be dependent on changes in the payloads of CAN messages of type Y and on CAN messages of type Z. The labeling module 180 will now label bit positions of CAN message type X as affected or unaffected bit by creating a training matrix wherein each row of the training matrix represents a given instance of a message of type X whose payload changes with respect to a previous instance. Each row comprises: a target cell representing adherence of the given instance to the statistical relationships between Y, Z and X; and source cells comprising the bits of the payloads of the given instance. The labeling module 180 trains one or more machine learning models using the training matrix to identify a most influencing bit. In our example bit position 63 is identified by the one or more machine learning models as the most influential bit, Labeling module 180 labels bit position 63 of CAN message of type X as unaffected. The column associated with bit position 63 is than removed from the training matrix, given rise to an amended training matrix, and the process of training the one or more machine learning models is repeated with the amended training matrix. In our example bit position 64 is now identified by the one or more machine learning models trained on the amended training matrix as the most influential bit. The process continues iteratively until all columns are removed from the training matrix, or until an accuracy score associated with the machine learning model being below a threshold. In our example labeling process 1000 stops after the second iteration. Bit position 63 and 64 of CAN message of type X are labeled as unaffected and all other bit positions of CAN message of type X are labeled as affected. In our example this is in correlation of bit positions 63 and 64 positions of CAN message of type X in our example being dependent on external behavior (in this example on the behavior of the driver) and thus cannot be modeled by CAN message of type Y and by CAN message of type Z.

In some cases, at least one of the machine learning models is a decision tree-based machine learning model, such as: a random forest machine learning model. It is to be noted that in these cases the most influencing bit is the strongest feature as found by the decision tree-based machine learning model.

In some cases, the accuracy score is determined according to a ROC-AUC metric. In more specific cases the threshold can be 0.5 or in the proximity of 0.5. For example, the threshold can be between 0.5 and 0.6 or in other cases the threshold can be between 0.5 and 0.51.

The affected bits labeled by the labeling module 180 can be statistically dependent on values of payloads of CAN messages of CAN message types excluding the given CAN message type. In these cases, the unaffected bits can be statistically dependent on external behaviors, external to values of payloads of CAN messages of CAN message types excluding the given CAN message type. In other cases, the unaffected bits can be statistically depended on a complex model representing statistical dependencies of the given CAN message type on the CAN message types excluding the given CAN message type that are with respect to changes that occur in earlier payloads (earlier than the previous message) and not only of the previous message as modeled in the described subject matter.

In cases wherein the unaffected bits are statistically dependent on external behaviors, the external behavior can a behavior of drivers of the one or more vehicles. It is to be noted that the driver can be an autonomous driving computer which automatically parses external inputs (traffic lights, object recognition) and makes driving decisions.

In some cases, the external behavior can be derived from external conditions. In some cases, the external conditions can be sensed by sensors (e.g. rain sensor, lighting sensors, traction sensors, etc.) of the one or more vehicles. The external conditions can be environmental conditions of the surrounding environment of the one or more vehicles, such as the weather in the surrounding environment. For example: a given CAN message type which unaffected bit positions are affected by rain dropping on the one or more vehicles affecting a rain sensor of the vehicle.

The labeling process 1000 can be used to segment payloads of the given CAN message type in accordance to the label, thereby enabling matching a better model to the given CAN message type. For example, for bit positions identified as unaffected bits (e.g. these bit positions are driver dependent) an appropriate model for such cases will be learned and enforced over these bit positions.

The labeling process 1000 can be used to focus the anomaly detection (for example, the message classification process 500 and/or the message sequence classification process 700 and/or second message sequence classification process 900, carried out by message analyzer 220 for identifying anomalies) on the affected bits results in reducing false positive anomaly detections in comparison to an amount of false positive anomaly detection that is not focused on the affected bits.

In addition, labeling process 1000 can be used as input to the anomaly detection engine generation process 400, specifically the labeling of bit positions as affected or unaffected bits can be associated with an additional attribute that is determined based on the labeling of the bit positions as affected or unaffected. This attribute can be associated with the pre-defined model types of a plurality of pre-defined model types as further detailed in block 430 of FIG. 4. This can be done by performing statistical tests on the unaffected bits and matching the most appropriate model accordingly.

It is to be noted that, with reference to FIG. 10, some of the blocks can be integrated into a consolidated block or can be broken down to a few blocks and/or other blocks may be added. It is to be further noted that some of the blocks are optional. It should be also noted that whilst the flow diagram is described also with reference to the system elements that realizes them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A system for generating an Anomaly Detection Engine (ADE) for Controller Area Network (CAN) messages, the system comprising a processing unit configured to:
   obtain a training set including a plurality of CAN messages associated with respective one or more vehicles, each CAN message having properties including (a) a CAN message type, (b) a size, (c) a payload, and (d) a corresponding timestamp;
   learn attributes for each CAN message type, based on at least one of the properties of a subset of the plurality of CAN messages having the respective CAN message type, wherein a given attribute of the attributes is based on an inter arrival time of the CAN messages of the subset and on a given statistical pattern is: (a) a synchronicity attribute upon the inter arrival time being derived from a stationary distribution, (b) an a-synchronicity attribute upon the inter arrival time not being derived from a non-stationary distribution, or (c) a hybridity attribute upon the inter arrival time of a second subset of the plurality of the CAN messages of the subset, not including at least one of the plurality of the CAN messages of the subset, being derived from a stationary distribution;
   associate each CAN message type with one or more respective selected pre-defined model types of a plurality of candidate pre-defined model types, based on the learned attributes for the respective CAN message type;
   train, for each CAN message type, one or more models of the respective one or more selected pre-defined model types, based on the corresponding subset, wherein each of the one or more models is usable for classifying a given CAN message of the respective CAN message type as anomalous or non-anomalous; and
   generate the ADE, wherein the ADE is usable for classifying an unclassified CAN message of a given CAN message type as anomalous or non-anomalous based on results of execution of the one or more models of the respective CAN message type on the unclassified CAN message.

2. The system of claim 1, wherein the attributes are also based on one or more of: (a) an average rate of change of the payload of the CAN messages of the subset, or (b) a boundedness of (i) the payload of the CAN messages of the subset, or (ii) parts of the payload of the CAN messages of the subset.

3. The system of claim 2, wherein a given attribute of the attributes is based on the boundedness and the given attribute is of one of the following types: (a) bounded attribute upon values of the payloads of the CAN messages of the subset being of a first limited set of values, (b) a non-bounded attribute upon the values of the payloads of the CAN messages of the subset not being of a second limited set of values.

4. The system of claim 1, wherein a relationship between the CAN message type and a respective functionality of the one or more vehicles is unknown.

5. The system of claim 1, wherein the CAN messages of the training set are obtained from one or more of: real-time recordings of CAN messages generated during vehicle rides, or simulations of vehicle rides.

6. A classification system comprising a second processing unit, the second processing unit being configured to:
   receive an unclassified CAN message; and
   classify the unclassified CAN message as anomalous or non-anomalous using the ADE of claim 1, giving rise to a classified CAN message.

7. The classification system of claim 6, wherein the second processing unit is further configured to perform an action upon the classified CAN message being classified as anomalous.

8. The classification system of claim 7, wherein the action includes one or more of the following:
   (a) providing an alert to an entity indicative of the classified CAN message being anomalous; or
   (b) performing a prevention measure for blocking or correcting the classified CAN message.

9. The classification system of claim 8, wherein the entity is one or more of: a driver of a vehicle associated with the classified CAN message, a mechanic service provider, a cyber analyst, a car manufacturer, an Original Equipment Manufacturer (OEM), or a fleet manager.

10. A method for generating an Anomaly Detection Engine (ADE) for Controller Area Network (CAN) messages, the method comprising:
    obtaining, by a processing unit, a training set including a plurality of CAN messages associated with respective one or more vehicles, each CAN message having properties including (a) a CAN message type, (b) a size, (c) a payload, and (d) a corresponding timestamp;

learning, by the processing unit, attributes for each CAN message type, based on at least one of the properties of a subset of the plurality of CAN messages having the respective CAN message type, wherein a given attribute of the attributes is based on an inter arrival time of the CAN messages of the subset and on a given statistical pattern is: (a) a synchronicity attribute upon the inter arrival time being derived from a stationary distribution, (b) an a-synchronicity attribute upon the inter arrival time not being derived from a non-stationary distribution, or (c) a hybridity attribute upon the inter arrival time of a second subset of the plurality of the CAN messages of the subset, not including at least one of the plurality of the CAN messages of the subset, being derived from a stationary distribution;

associating, by the processing unit, each CAN message type with one or more respective selected pre-defined model types of a plurality of candidate pre-defined model types, based on the learned attributes for the respective CAN message type;

training, by the processing unit, for each CAN message type, one or more models of the respective one or more selected pre-defined model types, based on the corresponding subset, wherein each of the one or more models is usable for classifying a given CAN message of the respective CAN message type as anomalous or non-anomalous; and generating, by the processing unit, the ADE, wherein the ADE is usable for classifying an unclassified CAN message of a given CAN message type as anomalous or non-anomalous based on results of execution of the one or more models of the respective CAN message type on the unclassified CAN message.

11. The method of claim 10, wherein the attributes are also based on one or more of: (a) an inter arrival time of the CAN messages of the subset, (b) an average rate of change of the payload of the CAN messages of the subset, or (c) a boundedness of (i) the payload of the CAN messages of the subset, or (ii) parts of the payload of the CAN messages of the subset.

12. The method of claim 11, wherein a given attribute of the attributes is based on the boundedness and the given attribute is of one of the following types: (a) bounded attribute upon values of the payloads of the CAN messages of the subset being of a first limited set of values, (b) a non-bounded attribute upon the values of the payloads of the CAN messages of the subset not being of a second limited set of values.

13. The method of claim 10, wherein a relationship between the CAN message type and a respective functionality of the one or more vehicles is unknown.

14. The method of claim 10, wherein the CAN messages of the training set are obtained from one or more of: real-time recordings of CAN messages generated during vehicle rides, or simulations of vehicle rides.

15. A classification method comprising:
receiving, by a second processing unit, an unclassified CAN message; and
classifying, by the second processing unit, the unclassified CAN message as anomalous or non-anomalous using the ADE of claim 10, giving rise to a classified CAN message.

16. The classification method of claim 15, further comprising performing an action upon the classified CAN message being classified as anomalous.

17. The classification method of claim 16, wherein the action includes one or more of the following:
(a) providing an alert to an entity indicative of the classified CAN message being anomalous; or
(b) performing a prevention measure for blocking or correcting the classified CAN message.

18. A non-transitory computer readable storage medium having computer readable program code embodied therewith, the computer readable program code, executable by a processing unit to perform a method for generating an Anomaly Detection Engine (ADE) for Controller Area Network (CAN) messages, the method comprising:

obtaining, by the processing unit, a training set including a plurality of CAN messages associated with respective one or more vehicles, each CAN message having properties including (a) a CAN message type, (b) a size, (c) a payload, and (d) a corresponding timestamp;

learning, by the processing unit, attributes for each CAN message type, based on at least one of the properties of a subset of the plurality of CAN messages having the respective CAN message type, wherein a given attribute of the attributes is based on an inter arrival time of the CAN messages of the subset and on a given statistical pattern is: (a) a synchronicity attribute upon the inter arrival time being derived from a stationary distribution, (b) an a-synchronicity attribute upon the inter arrival time not being derived from a non-stationary distribution, or (c) a hybridity attribute upon the inter arrival time of a second subset of the plurality of the CAN messages of the subset, not including at least one of the plurality of the CAN messages of the subset, being derived from a stationary distribution;

associating, by the processing unit, each CAN message type with one or more respective selected pre-defined model types of a plurality of candidate pre-defined model types, based on the learned attributes for the respective CAN message type;

training, by the processing unit, for each CAN message type, one or more models of the respective one or more selected pre-defined model types, based on the corresponding subset, wherein each of the one or more models is usable for classifying a given CAN message of the respective CAN message type as anomalous or non-anomalous; and generating, by the processing unit, the ADE, wherein the ADE is usable for classifying an unclassified CAN message of a given CAN message type as anomalous or non-anomalous based on results of execution of the one or more models of the respective CAN message type on the unclassified CAN message.

* * * * *